United States Patent
Mittricker et al.

(10) Patent No.: US 9,670,841 B2
(45) Date of Patent: Jun. 6, 2017

(54) METHODS OF VARYING LOW EMISSION TURBINE GAS RECYCLE CIRCUITS AND SYSTEMS AND APPARATUS RELATED THERETO

(75) Inventors: Franklin F. Mittricker, Jamul, CA (US); Richard A. Huntington, Houston, TX (US); Loren K. Starcher, Sugar Land, TX (US); Omar Angus Sites, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 603 days.

(21) Appl. No.: 14/002,620

(22) PCT Filed: Mar. 5, 2012

(86) PCT No.: PCT/US2012/027770
§ 371 (c)(1),
(2), (4) Date: Aug. 30, 2013

(87) PCT Pub. No.: WO2012/128924
PCT Pub. Date: Sep. 27, 2012

(65) Prior Publication Data
US 2014/0020398 A1    Jan. 23, 2014

Related U.S. Application Data

(60) Provisional application No. 61/466,381, filed on Mar. 22, 2011, provisional application No. 61/542,035, filed on Sep. 30, 2011.

(51) Int. Cl.
*F02C 3/34* (2006.01)
*F02C 7/141* (2006.01)

(52) U.S. Cl.
CPC ............... *F02C 3/34* (2013.01); *F02C 7/141* (2013.01); *F05D 2260/95* (2013.01); *Y02E 20/16* (2013.01)

(58) Field of Classification Search
CPC ........ F02C 3/34; F02C 7/141; F05D 2260/95; Y02E 20/16; F02M 26/00; F02M 26/22; F02M 26/24; F02M 26/33
See application file for complete search history.

(56) References Cited

U.S. PATENT DOCUMENTS

| 2,488,911 A | 11/1949 | Hepburn et al. |
| 2,884,758 A | 5/1959 | Oberle |

(Continued)

FOREIGN PATENT DOCUMENTS

| CA | 2231749 | 9/1998 |
| CA | 2550675 | 7/2005 |

(Continued)

OTHER PUBLICATIONS

Ahmed, S. et al. (1998) "Catalytic Partial Oxidation Reforming of Hydrocarbon Fuels," *1998 Fuel Cell Seminar*, Nov. 16-19, 1998, 7 pgs.

(Continued)

*Primary Examiner* — Carlos A Rivera
(74) *Attorney, Agent, or Firm* — ExxonMobil Upstream Research Company Law Department

(57) ABSTRACT

Systems and methods are provided for varying the exhaust gas recycle circuit of low emission gas turbines. In one or more embodiments, the systems and methods incorporate alternatives to the use of a direct contact cooler. In the same or other embodiments, the systems and methods incorporate alternatives intended to reduce or eliminate the erosion or corrosion of compressor blades due to the presence of acidic water droplets in the recycled gas stream.

42 Claims, 12 Drawing Sheets

(56) References Cited

U.S. PATENT DOCUMENTS

| | | |
|---|---|---|
| 3,561,895 A | 2/1971 | Michelson |
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis, III et al. |
| 3,949,548 A | 4/1976 | Lockwood, Jr. |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |

(56) References Cited

U.S. PATENT DOCUMENTS

| | | |
|---|---|---|
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,666 B1 | 9/2001 | Ginter ............ 60/39.05 |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,490,858 B2 | 12/2002 | Barrett et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier, Jr. |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,640,548 B2 | 11/2003 | Brushwood et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |

(56) References Cited

U.S. PATENT DOCUMENTS

| | | |
|---|---|---|
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear, Jr. et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman, II et al. |
| 7,536,873 B2 | 5/2009 | Nohlen |
| 7,540,150 B2 | 6/2009 | Schmid et al. |
| 7,544,337 B2 | 6/2009 | Ogura et al. ............ 423/210 |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Huntley Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,015,822 B2 | 9/2011 | Ranasinghe et al. ............ 60/772 |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |

(56) References Cited

U.S. PATENT DOCUMENTS

| | | |
|---|---|---|
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,555,796 B2 | 10/2013 | D'Agostini |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0029732 A1 | 10/2001 | Bachmann |
| 2001/0045090 A1 | 11/2001 | Gray, Jr. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0248527 A1 | 10/2007 | Spencer ............... 423/437.1 |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman, II et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |

(56) References Cited

U.S. PATENT DOCUMENTS

| | | |
|---|---|---|
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ElKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ElKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |

FOREIGN PATENT DOCUMENTS

| | | | |
|---|---|---|---|
| CA | 2645450 | 9/2007 | |
| CA | 2614669 | 12/2008 | |
| EP | 0453059 | 6/1994 | |
| EP | 0770771 | 5/1997 | |
| EP | 0654639 | 9/1998 | |
| GB | 0776269 | 6/1957 | |
| GB | 2117053 | 10/1983 | |
| GB | 2397349 | 7/2004 | |
| JP | 2001/012213 | 1/2001 | ............ F01K 25/06 |
| WO | WO95/21683 | 8/1995 | |
| WO | WO97/07329 | 2/1997 | |
| WO | WO99/06674 | 2/1999 | |
| WO | WO99/63210 | 12/1999 | |
| WO | WO2005/064232 | 7/2005 | |
| WO | WO2006/107209 | 10/2006 | |
| WO | WO2007/068682 | 6/2007 | |
| WO | WO2008/074980 | 6/2008 | |
| WO | WO2008/142009 | 11/2008 | |
| WO | WO2008/155242 | 12/2008 | |
| WO | WO2009/120779 | 10/2009 | |
| WO | WO2009/121008 | 10/2009 | |
| WO | WO2010/044958 | 4/2010 | |
| WO | WO2010/066048 | 7/2010 | |
| WO | WO2010/141777 | 12/2010 | |
| WO | WO2011/003606 | 1/2011 | |
| WO | WO2011/028322 | 3/2011 | |
| WO | WO2012/003076 | 1/2012 | |
| WO | WO2012/003077 | 1/2012 | |
| WO | WO2012/003078 | 1/2012 | |
| WO | WO2012/003079 | 1/2012 | |
| WO | WO2012/003080 | 1/2012 | |
| WO | WO2012003489 | 1/2012 | |
| WO | WO2012/018458 | 2/2012 | |
| WO | WO2012/018459 | 2/2012 | |
| WO | WO2012128928 | 9/2012 | |
| WO | WO2012128929 | 9/2012 | |
| WO | WO2012170114 | 12/2012 | |
| WO | WO2013147632 | 10/2013 | |
| WO | WO2013147633 | 10/2013 | |
| WO | WO2013155214 | 10/2013 | |
| WO | WO2013163045 | 10/2013 | |

OTHER PUBLICATIONS

Air Separation Technology Ion Transport Membrane—Air Products 2008.

Air Separation Technology Ion Transport Membrane—Air Products 2011.

Anderson, R. E. (2006) "Durability and Reliability Demonstration of a Near-Zero-Emission Gas-Fired Power Plant," *California Energy Comm., CEC 500-2006-074*, 80 pgs.

Baxter, E. et al. (2003) "Fabricate and Test an Advanced Non-Polluting Turbine Drive Gas Generator," *U. S. Dept. of Energy, Nat'l Energy Tech. Lab.*, DE-FC26-00NT 40804, 51 pgs.

Bolland, O. et al. (1998) "Removal of CO2 From Gas Turbine Power Plants Evaluation of Pre- and Postcombustion Methods," SINTEF Group, 1998, www.energy.sintef.no/publ/xergi/98/3/art-8engelsk.htm, 11 pgs.

BP Press Release (2006) "BP and Edison Mission Group Plan Major Hydrogen Power Project for California," Feb. 10, 2006, www.bp.com/hydrogenpower, 2 pgs.

Bryngelsson, M. et al. (2005) "Feasibility Study of CO2 Removal From Pressurized Flue Gas in a Fully Fired Combined Cycle—The Sargas Project," KTH—Royal Institute of Technology, Dept. of Chemical Engineering and Technology, 9 pgs.

Clark, Hal (2002) "Development of a Unique Gas Generator for a Non-Polluting Power Plant," California Energy Commission Feasibility Analysis, P500-02-011F, Mar. 2002, 42 pgs.

Ditaranto, et al. , (2006), "Combustion Instabilities in Sudden Expansion Oxy-Fuel Flames," *ScienceDirect, Combustion and Flame*, v. 146, Jun. 30, 2006, 15 pgs.

(56) References Cited

OTHER PUBLICATIONS

Foy, Kirsten et al. (2005) "Comparison of Ion Transport Membranes"—Fourth Annual Conference on Carbon Capture and Sequestration, DOE/NETL; May 2005, 11 pages.
Cho, J. H. et al. (2005) "Marrying LNG and Power Generation," *Energy Markets*; Oct./Nov. 2005; 10, 8; ABI/INFORM Trade & Industry, p. 28.
Ciulia, Vincent. About.com. Auto Repair. How the Engine Works. 2001-2003.
Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, Aug. 7-12, 1988, pp. 41-44.
Cryogenics. Science Clarified. 2012. http://www.scienceclarified.com/Co-Di/Cryogenics.html.
Defrate, L. A. et al. (1959) "Optimum Design of Ejector Using Digital Computers" Chem. Eng. Prog. Symp. Ser., 55 (21) pp. 46.
Elwell, L. C. et al. (2005) "Technical Overview of Carbon Dioxide Capture Technologies for Coal-Fired Power Plants," *MPR Associates, Inc.*, Jun. 22, 2005, 15 pgs.
Eriksson, Sara. Licentiate Thesis 2005, p. 22. KTH—"Development of Methane Oxidation Catalysts for Different Gas Turbine Combustor Concepts." The Royal Institute of Technology, Department of Chemical Engineering and Technology, Chemical Technology, Stockholm Sweden.
Ertesvag, I. S. et al. (2005) "Energy Analysis of a Gas-Turbine Combined-Cycle Power Plant With Precombustion $CO_2$ Capture," Elsivier, 2004, pp. 5-39.
Evulet, Andrei T. et al. "Application of Exhaust Gas Recirculation in a DLN F-Class Combustion System for Postcombustion Carbon Capture" ASME J. Engineering for Gas Turbines and Power, vol. 131, May 2009.
Evulet, Andrei T. et al. "On the Performance and Operability of GE's Dry Low Nox Combustors utilizing Exhaust Gas Recirculation for Post-Combustion Carbon Capture" Energy Procedia I 2009, 3809-3816.
http://www.turbineinletcooling.org/resources/papers/CTIC_WetCompression_Shepherd_ASMETurboExpo2011.pdf, Shepherd, IGTI 2011—CTIC Wet Compression, Jun. 8, 2011.
Luby, P. et al. (2003) "Zero Carbon Power Generation: IGCC as the Premium Option," *Powergen International*, 19 pgs.
MacAdam, S. et al. (2008) "Coal-Based Oxy-Fuel System Evaluation and Combustor Development," *Clean Energy Systems, Inc.* 6 pgs.
Morehead, H. (2007) "Siemens Global Gasification and IGCC Update," *Siemens, Coal-Gen*, Aug. 3, 2007, 17 pgs.
Nanda, R. et al. (2007) "Utilizing Air Based Technologies as Heat Source for LNG Vaporization," presented at the $86^{th}$ Annual convention of the *Gas Processors of America* (GPA 2007), Mar. 11-14, 2007, San Antonio, TX.
Reeves, S. R. (2001) "Geological Sequestration of $CO_2$ in Deep, Unmineable Coalbeds: An Integrated Research and Commercial-Scale Field Demonstration Project," *SPE 71749*, 10 pgs.
Reeves, S. R. (2003) "Enhanced Coalbed Methane Recovery," *SPE 101466-DL*, 8 pgs.
Richards, G. A. et al. (2001) "Advanced Steam Generators," *National Energy Technology Laboratory*, 7 pgs.
Rosetta, M. J. et al. (2006) "Integrating Ambient Air Vaporization Technology with Waste Heat Recovery—A Fresh Approach to LNG Vaporization," presented at the $85^{th}$ annual convention of the *Gas Processors of America* (GPA 2006), Grapevine, Texas, Mar. 5-8, 2006.
Snarheim, D. et al. (2006) "Control Design for a Gas Turbine Cycle With $CO_2$ Capture Capabilities," *Modeling, Identification and Control*, vol. 00, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.
vanHemert, P. et al. (2006) "Adsorption of Carbon Dioxide and a Hydrogen-Carbon Dioxide Mixture," *Intn'l Coalbed Methane Symposium* (Tuscaloosa, AL) *Paper 0615*, 9 pgs.
Zhu, J. et al. (2002) "Recovery of Coalbed Methane by Gas Injection," *SPE 75255*, 15 pgs.
U.S. Appl. No. 13/596,684, filed Aug. 28, 2012, Slobodyanskiy et al.
U.S. Appl. No. 14/066,579, filed Oct. 29, 2013, Huntington et al.
U.S. Appl. No. 14/066,551, filed Oct. 29, 2013, Minto.
U.S. Appl. No. 14/144,511, filed Dec. 30, 2013, Thatcher et al.
U.S. Appl. No. 14/067,559, filed Oct. 30, 2013, Lucas John Stoia et al.
PCT/RU2013/000162, Feb. 28, 2013, General Electric Company.
U.S. Appl. No. 14/067,679, filed Oct. 30, 2013, Elizabeth Angelyn Fadde et al.
U.S. Appl. No. 14/067,714, filed Oct. 30, 2013, Carolyn Ashley Antoniono et al.
U.S. Appl. No. 14/067,726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.
U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
PCT/US13/036020, filed Apr. 10, 2013, General Electric Company/ExxonMobil Upstream Company.
U.S. Appl. No. 14/067,486, filed Oct. 30, 2013, Huntington et al.
U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.

METHODS OF VARYING LOW EMISSION TURBINE GAS RECYCLE CIRCUITS AND SYSTEMS AND APPARATUS RELATED THERETO

CROSS REFERENCE TO RELATED APPLICATIONS

This application is the National Stage entry under 35 U.S.C. 371 of PCT/US2012/027770, that published as WO 2012/128924 and was filed on 5 Mar. 2012 which claims the benefit of U.S. Provisional Application 61/542,035, filed on 30 Sep. 2011 and U.S. Provisional Application 61/466,381, filed Mar. 22, 2011, each of which is incorporated by reference, in its entirety, for all purposes.

This application contains subject matter related to U.S. Provisional Application 61/542,039 filed Sep. 30, 2011 (PCT/US2012/027780, that published as WO 2012/128928 and was filed on 5 Mar. 2012); U.S. Provisional Application 61/542,041 filed Sep. 30, 2011 (PCT/US2012/027781, that published as WO 2012/128929 and was filed on 5 Mar. 2012; U.S. Provisional Application 61/542,037 filed Sep. 30, 2011 (PCT/US2012/027776, that published as WO 2012/128927 and was filed on 5 Mar. 2012); U.S. Provisional Application 61/542,036 filed Sep. 30, 2011 (PCT/US2012/027774, that published as WO 2012/128926 and was filed on 5 Mar. 2012); U.S. Provisional Application 61/466,384 filed Mar. 22, 2011 and U.S. Provisional Application 61/542,030 filed 30 Sep. 2011 (PCT/2012/027769, that published as WO 2012/128923 and was filed on 5 Mar. 2012); and U.S. Provisional Application 61/466,385 filed Mar. 22, 2011 and U.S. Provisional Application 61/542,031 filed Sep. 30, 2011 (PCT/US2012/027772, that published as WO 2012/128925 and was filed on 5 Mar. 2012).

FIELD OF THE DISCLOSURE

Embodiments of the disclosure relate to low emission power generation. More particularly, embodiments of the disclosure relate to methods and apparatus for varying low emission turbine gas recycle circuits.

BACKGROUND OF THE DISCLOSURE

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Many oil producing countries are experiencing strong domestic growth in power demand and have an interest in enhanced oil recovery (EOR) to improve oil recovery from their reservoirs. Two common EOR techniques include nitrogen ($N_2$) injection for reservoir pressure maintenance and carbon dioxide ($CO_2$) injection for miscible flooding for EOR. There is also a global concern regarding green house gas (GHG) emissions. This concern combined with the implementation of cap-and-trade policies in many countries makes reducing $CO_2$ emissions a priority for those countries as well as for the companies that operate hydrocarbon production systems therein.

Some approaches to lower $CO_2$ emissions include fuel de-carbonization or post-combustion capture using solvents, such as amines. However, both of these solutions are expensive and reduce power generation efficiency, resulting in lower power production, increased fuel demand and increased cost of electricity to meet domestic power demand. In particular, the presence of oxygen, $SO_X$, and $NO_X$ components makes the use of amine solvent absorption very problematic. Another approach is an oxyfuel gas turbine in a combined cycle (e.g., where exhaust heat from the gas turbine Brayton cycle is captured to make steam and produce additional power in a Rankin cycle). However, there are no commercially available gas turbines that can operate in such a cycle and the power required to produce high purity oxygen significantly reduces the overall efficiency of the process.

Moreover, with the growing concern about global climate change and the impact of carbon dioxide emissions, emphasis has been placed on minimizing carbon dioxide emissions from power plants. Gas turbine combined cycle power plants are efficient and have a lower cost compared to nuclear or coal power generation technologies. Capturing carbon dioxide from the exhaust of a gas turbine combined cycle power plant is very expensive for the following reasons: (a) the low concentration of carbon dioxide in the exhaust stack, (b) the large volume of gas that needs to be treated, (c) the low pressure of the exhaust stream, and the large amount of oxygen that is present in the exhaust stream. All of these factors result in a high cost of carbon dioxide capture from combined cycle plants.

Accordingly, there is still a substantial need for a low emission, high efficiency power generation and $CO_2$ capture manufacturing process.

SUMMARY OF THE DISCLOSURE

In the combined cycle power plants described herein, exhaust gases from low emission gas turbines, which are vented in a typical natural gas combined cycle (NGCC) plant, are instead cooled and recycled to the gas turbine main compressor inlet. The recycle exhaust gases, rather than excess compressed fresh air, are used to cool the products of combustion down to the material limitations in the expander. The combustion may be stoichiometric or non-stoichiometric. In one or more embodiments, by combining stoichiometric combustion with exhaust gas recycle, the concentration of $CO_2$ in the recirculating gases is increased while minimizing the presence of excess $O_2$, both of which make $CO_2$ recovery easier.

In one or more embodiments herein, methods are provided for varying the exhaust gas recycle circuit of such low emission gas turbine systems and apparatus related thereto. These methods improve the operability and cost effectiveness of low emission gas turbine operation. The methods, apparatus, and systems consider: (a) alternatives to using a direct contact cooler, which is a large and capital intensive piece of equipment, and (b) methods and apparatus for reducing erosion or corrosion on the blades in the first few sections of the main compressor caused by condensation of acidic water droplets in the recycle gas stream.

BRIEF DESCRIPTION OF THE DRAWINGS

The foregoing and other advantages of the present disclosure may become apparent upon reviewing the following detailed description and drawings of non-limiting examples of embodiments in which.

DETAILED DESCRIPTION

Figure 1:
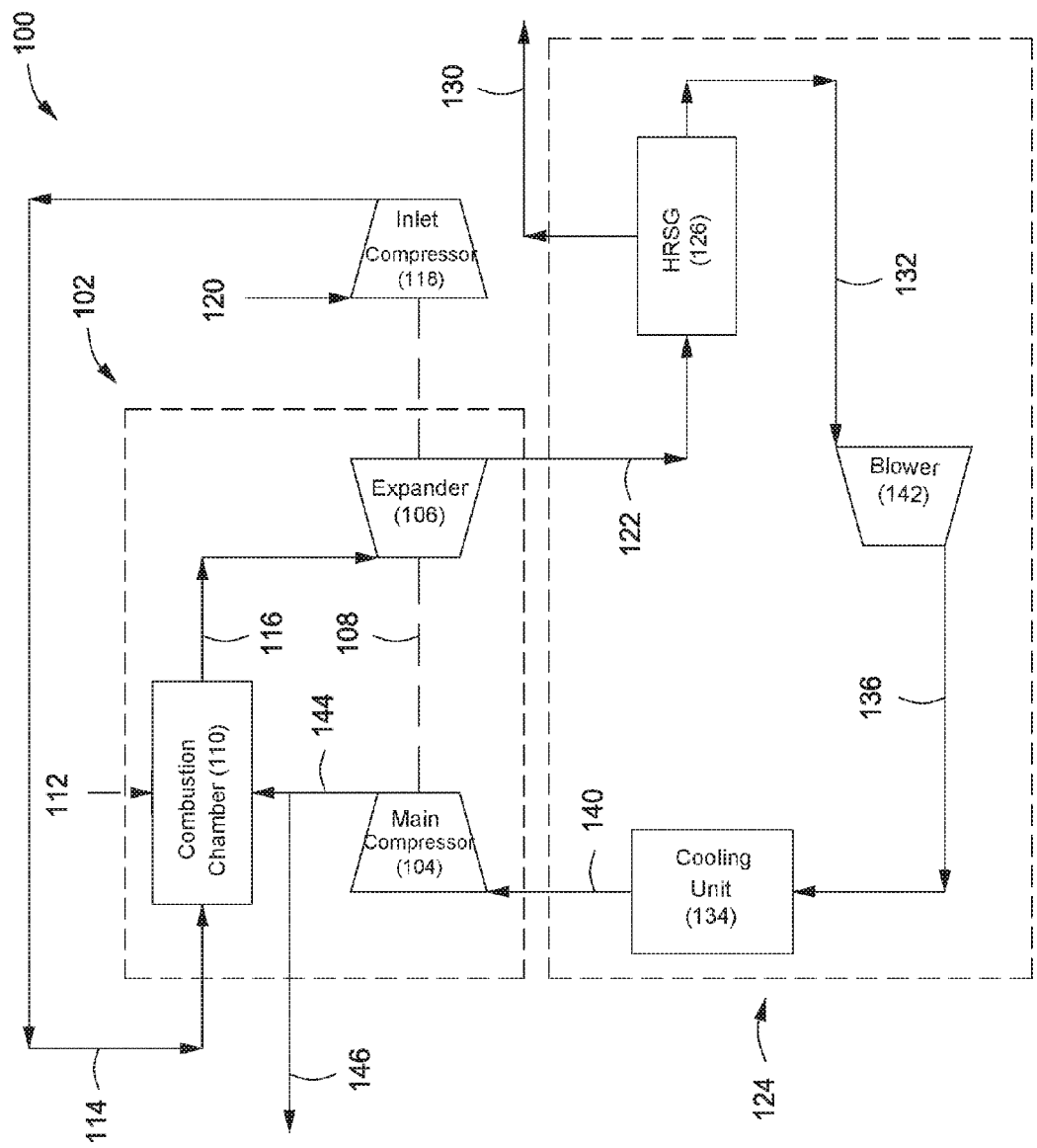
FIG. 1 depicts an integrated system for low emission power generation and enhanced $CO_2$ recovery according to one or more embodiments of the present disclosure.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

As used herein, the term "natural gas" refers to a multi-component gas obtained from a crude oil well (associated gas) and/or from a subterranean gas-bearing formation (non-associated gas). The composition and pressure of natural gas can vary significantly. A typical natural gas stream contains methane ($CH_4$) as a major component, i.e. greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., hydrogen sulfide), or any combination thereof. The natural gas can also contain minor amounts of contaminants such as water, nitrogen, iron sulfide, wax, crude oil, or any combination thereof.

As used herein, the term "stoichiometric combustion" refers to a combustion reaction having a volume of reactants comprising a fuel and an oxidizer and a volume of products formed by combusting the reactants where the entire volume of the reactants is used to form the products. As used herein, the term "substantially stoichiometric combustion" refers to a combustion reaction having an equivalence ratio ranging from about 0.9:1 to about 1.1:1, or more preferably from about 0.95:1 to about 1.05:1.

As used herein, the term "stream" refers to a volume of fluids, although use of the term stream typically means a moving volume of fluids (e.g., having a velocity or mass flow rate). The term "stream," however, does not require a velocity, mass flow rate, or a particular type of conduit for enclosing the stream.

Embodiments of the presently disclosed systems and processes may be used to produce ultra low emission electric power and $CO_2$ for applications such as enhanced oil recovery (EOR) or sequestration. According to embodiments disclosed herein, a mixture of air and fuel can be combusted and simultaneously mixed with a stream of recycled exhaust gas. The stream of recycled exhaust gas, generally including products of combustion such as $CO_2$, can be used as a diluent to control or otherwise moderate the temperature of the combustion and flue gas entering the succeeding expander.

The combustion may be stoichiometric or non-stoichiometric. Combustion at near stoichiometric conditions (or "slightly rich" combustion) can prove advantageous in order to eliminate the cost of excess oxygen removal. By cooling the flue gas and condensing the water out of the stream, a relatively high content $CO_2$ stream can be produced. While a portion of the recycled exhaust gas can be utilized for temperature moderation in the closed Brayton cycle, a remaining purge stream can be used for EOR applications and electric power can be produced with little or no $SO_X$, $NO_X$, or $CO_2$ being emitted to the atmosphere. For example, the purge stream can be treated in a $CO_2$ separator adapted to discharge a nitrogen-rich gas which can be subsequently expanded in a gas expander to generate additional mechanical power. The result of the systems disclosed herein is the production of power and the manufacturing or capture of additional $CO_2$ at a more economically efficient level.

In one or more embodiments, the present invention is directed to integrated systems comprising a gas turbine system and an exhaust gas recirculation system. The gas turbine system comprises a combustion chamber configured to combust one or more oxidants and one or more fuels in the presence of a compressed recycle stream and an exhaust gas recirculation system. The combustion chamber directs a first discharge stream to an expander to generate a gaseous exhaust stream and at least partially drive a main compressor, and the main compressor compresses the gaseous exhaust stream and thereby generates the compressed recycle stream. The exhaust gas recirculation system comprises at least one cooling unit configured to receive and cool the gaseous exhaust stream and at least one blower configured to receive and increase the pressure of the gaseous exhaust stream before directing a cooled recycle gas to the main compressor.

In certain embodiments, the at least one cooling unit may be a heat recovery steam generator (HRSG) configured to receive and cool the gaseous exhaust stream before introduction to the at least one blower. In the same or other embodiments, the exhaust gas recirculation system may further comprise a second cooling unit configured to receive the gaseous exhaust stream from the at least one blower and further cool the gaseous exhaust stream to generate the cooled recycle gas. The second cooling unit may comprise a direct contact cooler (DCC) section. Alternately, the second cooling unit may comprise a HRSG.

In some embodiments, the exhaust gas recirculation system may further comprise a third cooling unit configured to receive the gaseous exhaust stream from the at least one blower and further cool the gaseous exhaust stream before introduction to the second cooling unit. In such embodiments, the first cooling unit and the third cooling unit may comprise HRSGs. In one or more embodiments, the first cooling unit may comprise a HRSG comprising a high pressure boiler section, an intermediate pressure boiler section, and a low pressure boiler section, and the third cooling unit may comprise a HRSG comprising a low pressure boiler section and an economizer section.

In some embodiments, one or more HRSGs employed in the exhaust gas recirculation system may further comprise cooling water coils. In such embodiments, the system may further comprise a separator configured to receive the gaseous exhaust stream from the cooling water coils of the HRSG and remove water droplets from the gaseous exhaust stream before introduction to the blower or main compressor. In one or more embodiments, the separator is a vane pack, mesh pad, or other demisting device.

In one or more embodiments of the present invention, the exhaust gas recirculation system may employ psychrometric cooling of the gaseous exhaust stream. In some embodiments, water is added to the gaseous exhaust stream to saturate or nearly saturate the gaseous exhaust stream downstream of the first cooling unit but before introduction to the blower, and the exhaust gas recirculation system further comprises a separator configured to receive the saturated or nearly saturated gaseous exhaust stream and remove water droplets from the saturated or nearly saturated gaseous exhaust stream before introduction to the blower. In such embodiments, the second cooling unit is further configured to remove water from the gaseous exhaust stream and recycle at least part of the water removed. The water removed from the gaseous exhaust stream by the second cooling unit may be divided into two or more portions, such that a first portion of the water is recycled and added to the gaseous exhaust stream upstream of the separator and a second portion of the water is recycled to the second cooling unit.

In one or more embodiments, the exhaust gas recirculation system may further comprise a feed/effluent cross exchanger across the second cooling unit configured to adjust the temperature of the cooled recycle gas such that a dew point margin of at least about 20° F., or at least about 25° F., or at least about 30° F., or at least about 35° F., or at least about 40° F., or at least about 45° F., or at least about 50° F. is achieved.

In one or more embodiments, the second cooling unit further comprises a glycol absorption section, such as for example a triethylene glycol (TEG) absorption section, configured to receive the cooled recycle gas from the upstream recycle gas cooling equipment and at least partially dehydrate the cooled recycle gas before introduction to the main compressor, and the exhaust gas recirculation system further comprises a glycol regeneration system configured to receive rich glycol from the glycol absorption section of the second cooling unit, thermally regenerate the rich glycol in a glycol regeneration column to form regenerated lean glycol, and return the regenerated lean glycol to the glycol absorption section. In some embodiments, the glycol regeneration system is operated under vacuum conditions. The glycol regeneration system may be separate from or integrated into the second cooling unit. In one or more embodiments, the second cooling unit comprises the glycol regeneration column and the glycol regeneration column is configured to receive the gaseous exhaust stream from the blower before introduction to the upstream recycle gas cooling equipment. In the same or other embodiments, the second cooling unit may further comprise a desuperheating section positioned between the glycol regeneration column and the upstream recycle gas cooling equipment. Any suitable glycol may be used in the glycol absorption systems described herein. For example, in one or more embodiments the glycol is triethylene glycol (TEG). Further, in one or more other embodiments of the present invention, another suitable method for dehydrating the cooled recycle gas may be employed in place of glycol dehydration, such as for example mole sieves or methanol dehydration.

In one or more embodiments, the present invention is directed to methods of generating power. The methods comprise combusting at least one oxidant and at least one fuel in a combustion chamber in the presence of a compressed recycle exhaust gas, thereby generating a discharge stream, expanding the discharge stream in an expander to at least partially drive a main compressor and generate a gaseous exhaust stream, and directing the gaseous exhaust stream to an exhaust gas recirculation system. The main compressor compresses the gaseous exhaust stream and thereby generates the compressed recycle stream. In such methods, the exhaust gas recirculation system comprises at least one cooling unit and at least one blower, such that the gaseous exhaust stream is cooled in at the least one cooling unit and the pressure of the gaseous exhaust stream is increased in the at least one blower, thereby generating a cooled recycle gas directed to the main compressor.

In one or more methods of the present invention, the at least one cooling unit is a direct contact cooler (DCC), heat recovery steam generator (HRSG), or other suitable cooling device that cools the gaseous exhaust stream before the gaseous exhaust stream is introduced to the at least one blower. In the same or other methods, the exhaust gas recirculation system further comprises a second cooling unit that receives the gaseous exhaust stream from the at least one blower and further cools the gaseous exhaust stream, thereby generating the cooled recycle gas. The second cooling unit may comprise a DCC, a HRSG, or other suitable cooling device.

In some methods, the exhaust gas recirculation system may further comprise a third cooling unit that receives the gaseous exhaust stream from the at least one blower and further cools the gaseous exhaust stream before the gaseous exhaust stream is introduced to the second cooling unit. In one or more methods, the first cooling unit and the third cooling unit comprise HRSGs. In the same or other methods, the first cooling unit may comprise a HRSG comprising a high pressure boiler section, an intermediate pressure boiler section, and a low pressure boiler section, and the third cooling unit may comprise a HRSG comprising a low pressure boiler section and an economizer section.

In some methods, one or more of the HRSGs employed in the exhaust gas recirculation system may further comprise cooling water coils. In such methods, a separator may receive the gaseous exhaust stream from the cooling water coils of the HRSG and remove water droplets from the gaseous exhaust stream before the gaseous exhaust stream is introduced to the blower or main compressor. In one or more embodiments, the separator is a vane pack, mesh pad, or other demisting device.

In one or more methods of the present invention, the exhaust gas recirculation system employs psychrometric cooling to further cool the gaseous exhaust stream. In some of those methods, the gaseous exhaust stream is saturated or nearly saturated with water before the gaseous exhaust stream is introduced to the blower, the exhaust gas recirculation system further comprises a separator that receives the saturated or nearly saturated gaseous exhaust stream and removes water droplets from the saturated or nearly saturated gaseous exhaust stream before the gaseous exhaust stream is introduced to the blower, and the second cooling unit removes water from the gaseous exhaust stream and at least part of the water removed by the second cooling unit is recycled. In one or more methods, the water removed from the gaseous exhaust stream by the second cooling unit is divided into two or more portions and a first portion of the water is recycled and added to the gaseous exhaust stream upstream of the separator while a second portion of the water is recycled to the second cooling unit.

In one or more embodiments of the present invention, a dew point margin of at least about 20° F., or at least about 25° F., or at least about 30° F., or at least about 35° F., or at least about 40° F., or at least about 45° F., or at least about 50° F. is achieved in the cooled recycle gas by modifying the temperature of the cooled recycle gas in a feed/effluent cross exchanger across the second cooling unit.

In one or more methods of the present invention, the second cooling unit further comprises a glycol absorption section that receives the cooled recycle gas from the upstream recycle gas cooling equipment and at least partially dehydrates the cooled recycle gas before the cooled recycle gas is introduced to the main compressor, and the exhaust gas recirculation system further comprises a glycol regeneration system that receives rich glycol from the glycol absorption section of the second cooling unit, thermally regenerates the rich glycol in a glycol regeneration column to form regenerated lean glycol, and returns the regenerated lean glycol to the glycol absorption section. In some methods, the glycol regeneration system is operated under vacuum conditions. The glycol regeneration system may be separate from or integrated into the second cooling unit. In one or more methods, the second cooling unit comprises the glycol regeneration column and the glycol regeneration column receives the gaseous exhaust stream from the blower before the gaseous exhaust stream is introduced to the upstream recycle gas cooling equipment. In the same or other methods, the second cooling unit may further comprise a desuperheating section positioned between the glycol regeneration column and the upstream recycle gas cooling equipment that receives the gaseous exhaust stream from the glycol regeneration column and cools the gaseous exhaust stream to a temperature sufficient to at least partially condense glycol from the gaseous exhaust stream before the gaseous exhaust stream is introduced to the upstream recycle gas cooling equipment.

Referring now to the figures, FIG. 1 illustrates a power generation system 100 configured to provide an improved post-combustion $CO_2$ capture process. In at least one embodiment, the power generation system 100 can include a gas turbine system 102 that can be characterized as a closed Brayton cycle. In one embodiment, the gas turbine system 102 can have a first or main compressor 104 coupled to an expander 106 through a common shaft 108 or other mechanical, electrical, or other power coupling, thereby allowing a portion of the mechanical energy generated by the expander 106 to drive the compressor 104. The expander 106 may generate power for other uses as well, such as to power a second or inlet compressor 118. The gas turbine system 102 can be a standard gas turbine, where the main compressor 104 and expander 106 form the compressor and expander ends, respectively, of the standard gas turbine. In other embodiments, however, the main compressor 104 and expander 106 can be individualized components in a system 102.

The gas turbine system 102 can also include a combustion chamber 110 configured to combust a fuel stream 112 mixed with a compressed oxidant 114. In one or more embodiments, the fuel stream 112 can include any suitable hydrocarbon gas or liquid, such as natural gas, methane, naphtha, butane, propane, syngas, diesel, kerosene, aviation fuel, coal derived fuel, bio-fuel, oxygenated hydrocarbon feedstock, or combinations thereof. The compressed oxidant 114 can be derived from a second or inlet compressor 118 fluidly coupled to the combustion chamber 110 and adapted to compress a feed oxidant 120. In one or more embodiments, the feed oxidant 120 can include any suitable gas containing oxygen, such as air, oxygen-rich air, or combinations thereof.

As will be described in more detail below, the combustion chamber 110 can also receive a compressed recycle stream 144, including a flue gas primarily having $CO_2$ and nitrogen components. The compressed recycle stream 144 can be derived from the main compressor 104 and adapted to help facilitate the combustion of the compressed oxidant 114 and fuel 112, and also increase the $CO_2$ concentration in the working fluid. A discharge stream 116 directed to the inlet of the expander 106 can be generated as a product of combustion of the fuel stream 112 and the compressed oxidant 114, in the presence of the compressed recycle stream 144. In at least one embodiment, the fuel stream 112 can be primarily natural gas, thereby generating a discharge 116 including volumetric portions of vaporized water, $CO_2$, nitrogen, nitrogen oxides ($NO_X$), and sulfur oxides ($SO_X$). In some embodiments, a small portion of unburned fuel 112 or other compounds may also be present in the discharge 116 due to combustion equilibrium limitations. As the discharge stream 116 expands through the expander 106 it generates mechanical power to drive the main compressor 104, or other facilities, and also produces a gaseous exhaust stream 122 having a heightened $CO_2$ content.

The power generation system 100 can also include an exhaust gas recirculation (EGR) system 124. While the EGR system 124 illustrated in the figures incorporates various apparatus, the illustrated configurations are representative only and any system that recirculates the exhaust gas 122 back to the main compressor to accomplish the goals stated herein may be used. In one or more embodiments, the EGR system 124 can include a heat recovery steam generator (HRSG) 126, or similar device. The gaseous exhaust stream 122 can be sent to the HRSG 126 in order to generate a stream of steam 130 and a cooled exhaust gas 132. The steam 130 can optionally be sent to a steam gas turbine (not shown) to generate additional electrical power. In such configurations, the combination of the HRSG 126 and the steam gas turbine can be characterized as a closed Rankine cycle. In combination with the gas turbine system 102, the HRSG 126 and the steam gas turbine can form part of a combined-cycle power generating plant, such as a natural gas combined-cycle (NGCC) plant.

FIG. 1 illustrates additional apparatus in the EGR system 124 that may be incorporated in some embodiments. The cooled exhaust gas 132 can be sent to at least one cooling unit 134 configured to reduce the temperature of the cooled exhaust gas 132 and generate a cooled recycle gas stream 140. In one or more embodiments, the cooling unit 134 is considered herein to be a direct contact cooler (DCC), but may be any suitable cooling device such as a direct contact cooler, trim cooler, a mechanical refrigeration unit, or combinations thereof. The cooling unit 134 can also be configured to remove a portion of condensed water via a water dropout stream (not shown). In one or more embodiments, the cooled exhaust gas stream 132 can be directed to a blower or boost compressor 142 fluidly coupled to the cooling unit 134. In such embodiments, compressed exhaust gas stream 136 exits the blower 142 and is directed to the cooling unit 134.

The blower 142 can be configured to increase the pressure of the cooled exhaust gas stream 132 before it is introduced into the main compressor 104. In one or more embodiments, the blower 142 increases the overall density of the cooled exhaust gas stream 132, thereby directing an increased mass flow rate for the same volumetric flow to the main compressor 104. Because the main compressor 104 is typically volume-flow limited, directing more mass flow through the main compressor 104 can result in a higher discharge pressure from the main compressor 104, thereby translating into a higher pressure ratio across the expander 106. A higher pressure ratio generated across the expander 106 can allow for higher inlet temperatures and, therefore, an increase in expander 106 power and efficiency. This can prove advantageous since the $CO_2$-rich discharge 116 generally maintains a higher specific heat capacity. Accordingly, the cooling unit 134 and the blower 142, when incorporated, may each be adapted to optimize or improve the operation of the gas turbine system 102. It should be noted that, although the blower 142 is shown in a particular location in the EGR system 124 in FIG. 1 and in the other drawings and examples described herein, the blower may be located anywhere throughout the recycle loop.

The main compressor 104 can be configured to compress the cooled recycle gas stream 140 received from the EGR system 124 to a pressure nominally above the combustion chamber 110 pressure, thereby generating the compressed recycle stream 144. In at least one embodiment, a purge stream 146 can be tapped from the compressed recycle stream 144 and subsequently treated in a $CO_2$ separator or other apparatus (not shown) to capture $CO_2$. The separated $CO_2$ can be used for sales, used in another process requiring carbon dioxide, and/or compressed and injected into a terrestrial reservoir for enhanced oil recovery (EOR), sequestration, or another purpose.

The EGR system 124 as described herein can be implemented to achieve a higher concentration of $CO_2$ in the working fluid of the power generation system 100, thereby allowing for more effective $CO_2$ separation for subsequent sequestration, pressure maintenance, or EOR applications. For instance, embodiments disclosed herein can effectively increase the concentration of $CO_2$ in the flue gas exhaust stream to about 10 wt % or higher. To accomplish this, the combustion chamber 110 can be adapted to stoichiometrically combust the incoming mixture of fuel 112 and compressed oxidant 114. In order to moderate the temperature of the stoichiometric combustion to meet expander 106 inlet temperature and component cooling requirements, a portion of the exhaust gas derived from the compressed recycle stream 144 can be injected into the combustion chamber 110 as a diluent. Thus, embodiments of the disclosure can essentially eliminate any excess oxygen from the working fluid while simultaneously increasing its $CO_2$ composition. As such, the gaseous exhaust stream 122 can have less than about 3.0 vol % oxygen, or less than about 1.0 vol % oxygen, or less than about 0.1 vol % oxygen, or even less than about 0.001 vol % oxygen. In some implementations, the combustion chamber 110, or more particularly, the inlet streams to the combustion chamber may be controlled with a preference to substoichiometric combustion to further reduce the oxygen content of the gaseous exhaust stream 122.

In some embodiments not depicted herein, high pressure steam may also be employed as a coolant in the combustion process, either in place of or in addition to the recycled exhaust gas. In such embodiments, the addition of steam would reduce power and size requirements in the EGR system (or eliminate the EGR system altogether), but would require the addition of a water recycle loop.

Additionally, in further embodiments not depicted herein, the compressed oxidant feed to the combustion chamber may comprise argon. For example, the oxidant may comprise from about 0.1 to about 5.0 vol % argon, or from about 1.0 to about 4.5 vol % argon, or from about 2.0 to about 4.0 vol % argon, or from about 2.5 to about 3.5 vol % argon, or about 3.0 vol % argon. In such embodiments, the operation of the combustion chamber may be stoichiometric or non-stoichiometric. As will be appreciated by those skilled in the art, incorporating argon into the compressed oxidant feed may require the addition of a cross exchanger or similar device between the main compressor and the combustion chamber configured to remove excess $CO_2$ from the recycle stream and return argon to the combustion chamber at the appropriate temperature for combustion.

As can be appreciated, specific temperatures and pressures achieved or experienced in the various components of any of the embodiments disclosed herein can change depending on, among other factors, the purity of the oxidant used and the specific makes and/or models of expanders, compressors, coolers, etc. Accordingly, it will be appreciated that the particular data described herein is for illustrative purposes only and should not be construed as the only interpretation thereof. For example, in one exemplary embodiment herein, the HRSG 126 cools the exhaust gas stream 132 to approximately 200° F. Exhaust gas stream 132 is boosted in pressure by the blower 142 in order to overcome the downstream pressure drop, resulting in a temperature increase such that cooled compressed exhaust gas stream 136 exits the blower 142 at approximately 229° F. The exhaust gas is further cooled in the cooling unit 134, and cooled recycle gas stream 140 exits the cooling unit 134 at approximately 100° F.

Figure 2:
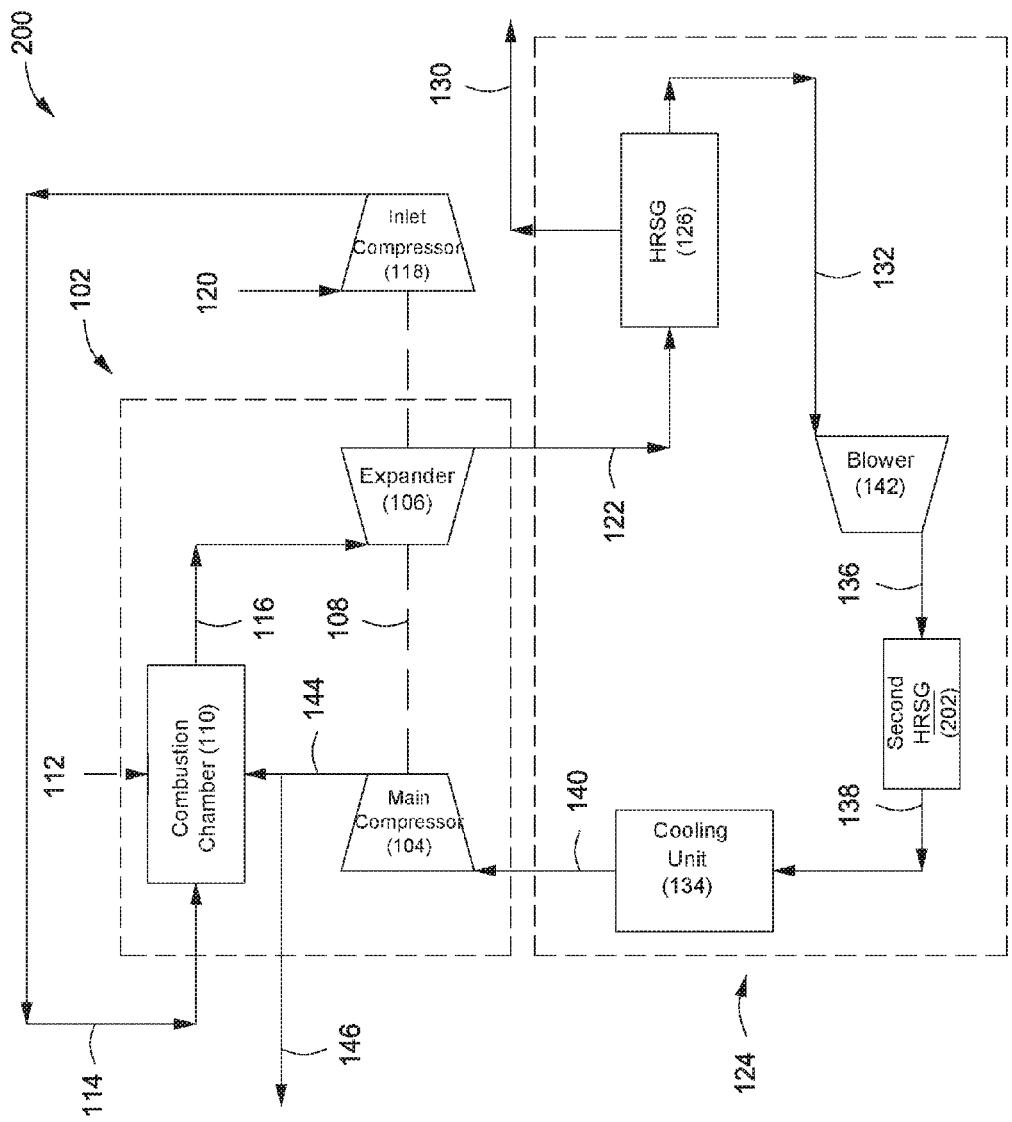
FIG. 2 depicts an integrated system for low emission power generation and enhanced $CO_2$ recovery according to one or more embodiments of the present disclosure wherein the blower is downstream of the heat recovery steam generator (HRSG) low pressure boiler.

Referring now to FIG. 2, depicted is an alternative embodiment of the power generation system 100 of FIG. 1, embodied and described as system 200. As such, FIG. 2 may be best understood with reference to FIG. 1. Similar to the system 100 of FIG. 1, the system 200 of FIG. 2 includes a gas turbine system 102 coupled to or otherwise supported by an exhaust gas recirculation (EGR) system 124. The EGR system 124 in FIG. 2, however, can include a second HRSG 202 downstream of the blower 142 to recover the heat of compression associated with the blower 142. In one or more embodiments exemplified by the EGR system of FIG. 2, the first HRSG 126 is a triple pressure HRSG including high pressure (HP), intermediate pressure (IP) and low pressure (LP) boiler sections, while the second HRSG 202 includes LP boiler and economizer sections. In an exemplary method of operation of system 200, the exhaust gas stream 132 exits the LP boiler section of HRSG 126 at a temperature of approximately 279° F. and is compressed in the blower 142. Cooled compressed exhaust gas stream 136 exits the blower 142 at a temperature of about 310° F., and enters the second HRSG 202. Recycle gas stream 138 then exits the second HRSG 202 at a temperature of approximately 200° F. In this manner, the blower heat of compression is recovered by HRSG 202 and the cooling duty of the cooling unit 134 is reduced.

Figure 3:
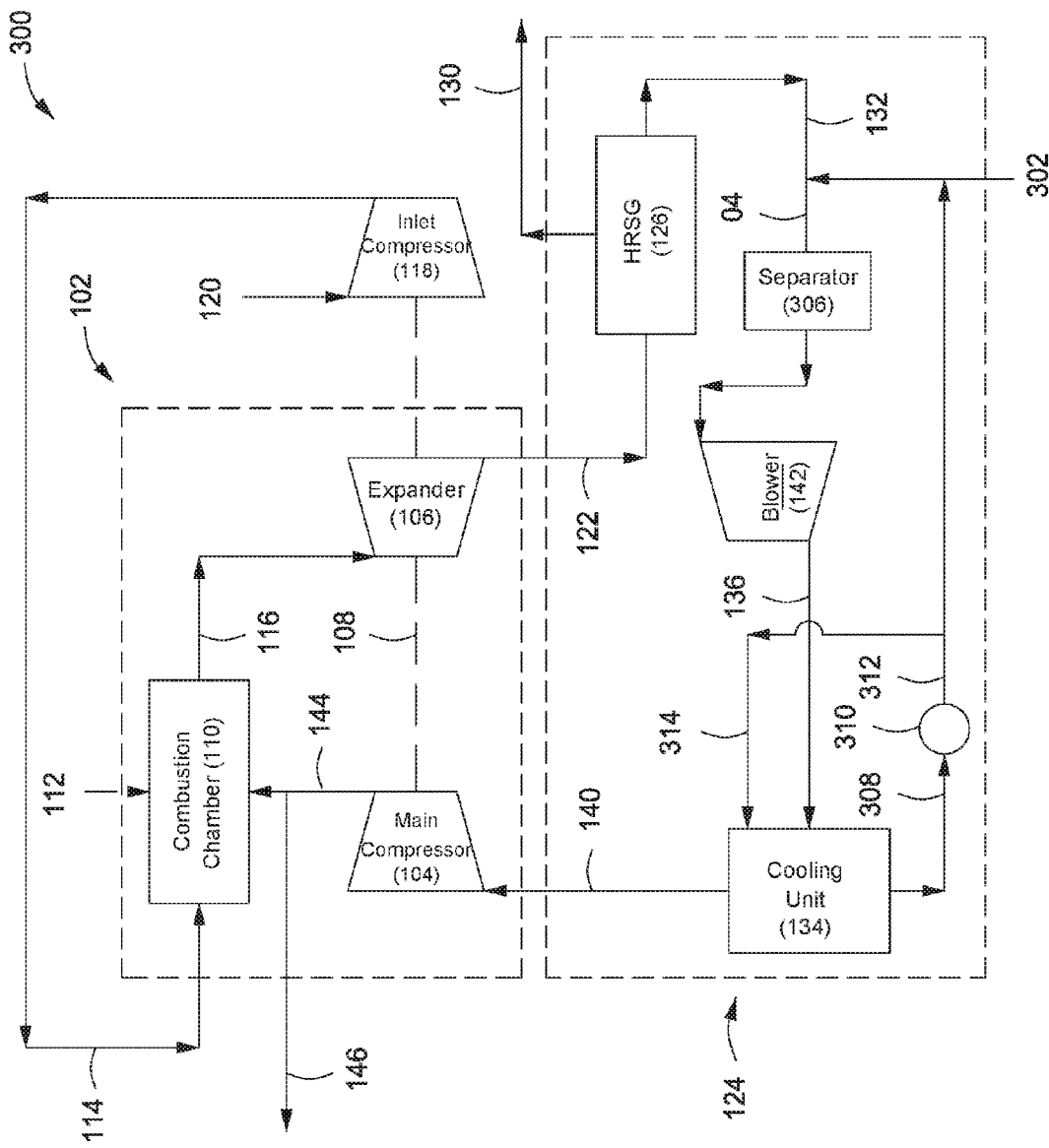
FIG. 3 depicts an integrated system for low emission power generation and enhanced $CO_2$ recovery according to one or more embodiments of the present disclosure utilizing psychrometric cooling of the blower inlet.

FIG. 3 depicts another embodiment of the low emission power generation system 100 of FIG. 1, embodied as system 300. As such, FIG. 3 may be best understood with reference to FIG. 1. Similar to the system 100 described in FIG. 1, the system 300 includes a gas turbine system 102 supported by or otherwise coupled to an EGR system 124. The EGR system 124 in FIG. 3, however, employs psychrometric cooling to reduce power consumption of the blower 142 and reduce the cooling duty of the cooling unit 134. In one or more embodiments exemplified by the EGR system of FIG. 3, water is injected via stream 302 to saturate or nearly saturate and cool exhaust gas stream 132, resulting in a saturated exhaust gas stream 304. Saturated exhaust gas stream 304 may optionally be directed to a separator 306 to remove any water droplets that may be entrained therein. Separator 306 can be any device suitable for the removal of water droplets, such as for example a vane pack, mesh pad, or other demisting device. The pressure of saturated exhaust gas stream 304 is increased in the blower 142. Cooled compressed exhaust gas stream 136 exits the blower 142 and is directed to the cooling unit 134. In the cooling unit, water condenses out of cooled compressed exhaust gas stream 136 as the stream is further cooled, and the water is recovered in water stream 308. In one or more embodiments of the invention, water stream 308 may be cooled in a heat exchanger 310 or other cooling device, resulting in cooled water stream 312. Cooled water stream 312 may then be recycled via recycle water stream 314 to provide additional cooling of the exhaust gas in the cooling unit 134, combined with water stream 302 to be injected into exhaust gas stream 132 upstream of the blower 142, or both. While water stream 302 may be employed at some points during operation of the system of FIG. 3, such as for example during start-up or when makeup water is needed in the system, it will be apparent to those skilled in the art that there may be times (for example during steady state operation) that the amount of water required for injection into exhaust gas stream 132 may be supplied entirely by the recycle of cooled water stream 312.

In an exemplary method of operation of system 300, the exhaust gas stream 132 exits the HRSG 126 at a temperature of approximately 200° F. The injection of water via stream 302 cools the exhaust gas, resulting in saturated exhaust gas stream 304 having a temperature of approximately 129° F. Once compressed in the blower 142, cooled compressed exhaust gas stream 136 exits the blower 142 at a temperature of about 154° F., and is cooled in the cooling unit 134 resulting in cooled recycle gas stream at a temperature of approximately 100° F. In this manner, the blower adds less heat to the system and the cooling duty of the cooling unit 134 is reduced.

Figure 4:
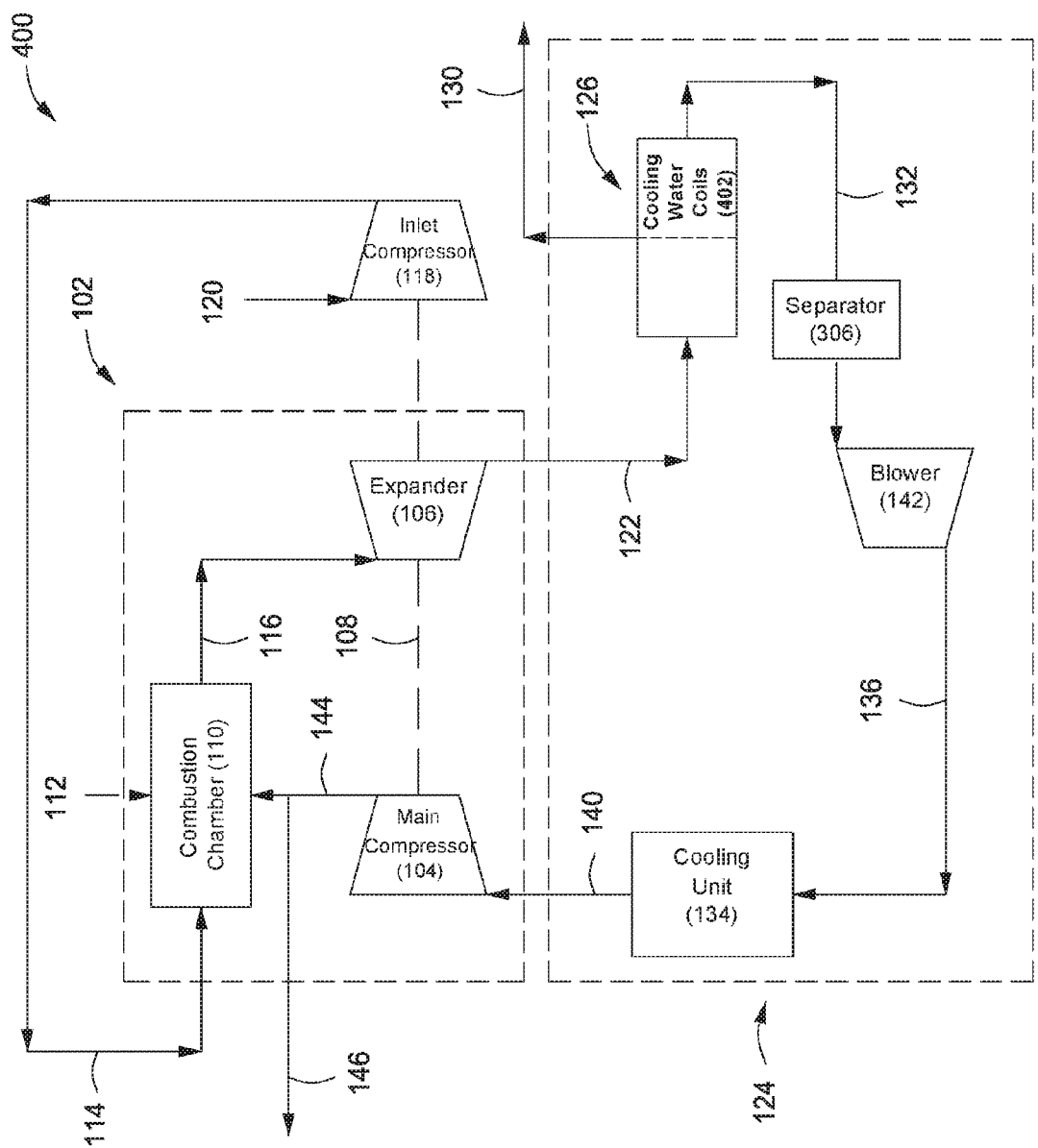
FIG. 4 depicts an integrated system for low emission power generation and enhanced $CO_2$ recovery according to one or more embodiments of the present disclosure utilizing cooling water coils in the HRSG.

FIG. 4 depicts another embodiment of the low emission power generation system 100 of FIG. 1, embodied as system 400. FIG. 4 may be best understood with reference to FIGS. 1 and 3. Similar to the system 100 described in FIG. 1, the system 400 includes a gas turbine system 102 supported by or otherwise coupled to an EGR system 124. The EGR system 124 in FIG. 4, however, employs cooling water coils in the HRSG to reduce the cooling duty of the cooling unit 134. In one or more embodiments exemplified by the EGR system of FIG. 3, cooling water coils 402 are employed within the HRSG 126 to provide additional cooling of exhaust gas stream 122. The cooling water coils may be adapted to employ fresh cooling water or seawater. To use fresh cooling water, in some embodiments a closed fresh water system may be included in the design (not shown), with plate and frame exchangers that cool the fresh water against seawater to achieve maximum cooling. If seawater coils are used in the HRSG, the HRSG tubes should be of sufficient metallurgy to handle both potential acidic water condensation and seawater. Cooled exhaust gas stream 132 exits the HRSG 126 and may optionally be directed to a separator 306 to remove any water droplets that may be entrained therein. Separator 306 can be any device suitable for the removal of water droplets, such as for example a vane pack, mesh pad, or other demisting device. Once any entrained water droplets are removed by separator 306, the cooled exhaust gas stream 132 is directed to the blower 142 and the EGR system downstream of the blower is as previously described with respect to FIG. 1.

In an exemplary method of operation of system 400, cooled exhaust gas stream 132 exits the cooling water coils 402 of HRSG 126 at a temperature of approximately 118° F., and compressed exhaust gas stream 136 exits the blower 142 at a temperature of approximately 140° F. The exhaust gas is cooled in the cooling unit 134, and cooled recycle gas stream 140 exits the cooling unit 134 at approximately 100° F. Because the compressed exhaust gas stream 136 in the system 400 of FIG. 4 enters the cooling unit 134 at a lower temperature than in the previously described systems of FIGS. 1-3, the duty of the cooling unit is reduced with respect to those systems.

Figure 5:
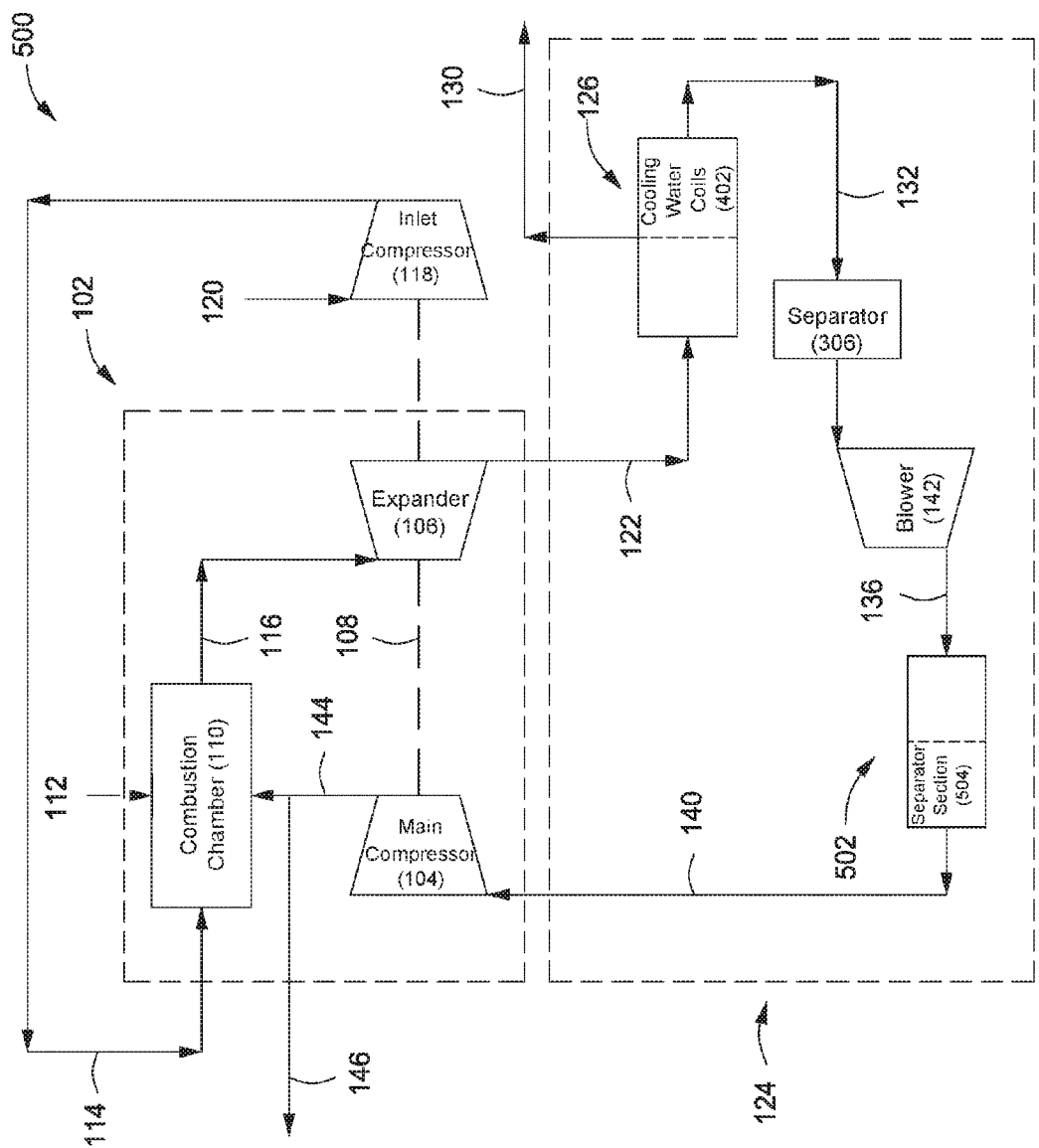
FIG. 5 depicts an integrated system for low emission power generation and enhanced $CO_2$ recovery according to one or more embodiments of the present disclosure, which eliminates the direct contact cooler (DCC) and saturates the inlet to the recycle compressor.

FIG. 5 depicts another embodiment of the low emission power generation system 100 of FIG. 1, embodied as system 500. FIG. 5 may be best understood with reference to FIGS. 1 and 4. Similar to the system 100 described in FIG. 1, the system 500 includes a gas turbine system 102 supported by or otherwise coupled to an EGR system 124. The EGR system 124 in FIG. 5 employs cooling water coils 402 in the HRSG 126 and a separator 306 upstream of the blower 142 as described in detail with respect to FIG. 4. FIG. 5, however, also employs an additional HRSG 502 downstream of the blower 142, replacing the direct contact cooler (DCC) cooling unit described previously with respect to FIGS. 1-4. The HRSG 502 includes a cooling water section similar to the cooling water coils 402 contained within the first HRSG 126. A separator section 504 is also included within the additional HRSG 502 to remove any condensed water droplets from the compressed exhaust gas stream 136. Separator section 504 can be any device suitable for the removal of water droplets, such as for example a vane pack, mesh pad, or other demisting device. Once any water droplets are removed by separator section 504 within the additional HRSG 502, cooled recycle gas stream 140 exits the HRSG 502 and is recycled directly to the main compressor 104.

In an exemplary method of operation of system 500, cooled exhaust gas stream 132 exits the cooling water coils 402 of the first HRSG 126 at a temperature of approximately 113° F., and compressed exhaust gas stream 136 exits the blower 142 at a temperature of approximately 143° F. The exhaust gas is further cooled in the second HRSG 502, and cooled recycle gas stream 140 exits the separator section 504 of the second HRSG at approximately 113° F. In one or more embodiments according to FIG. 5, the cooled recycle gas stream 140 entering the main compressor 104 is saturated with water.

Figure 6:
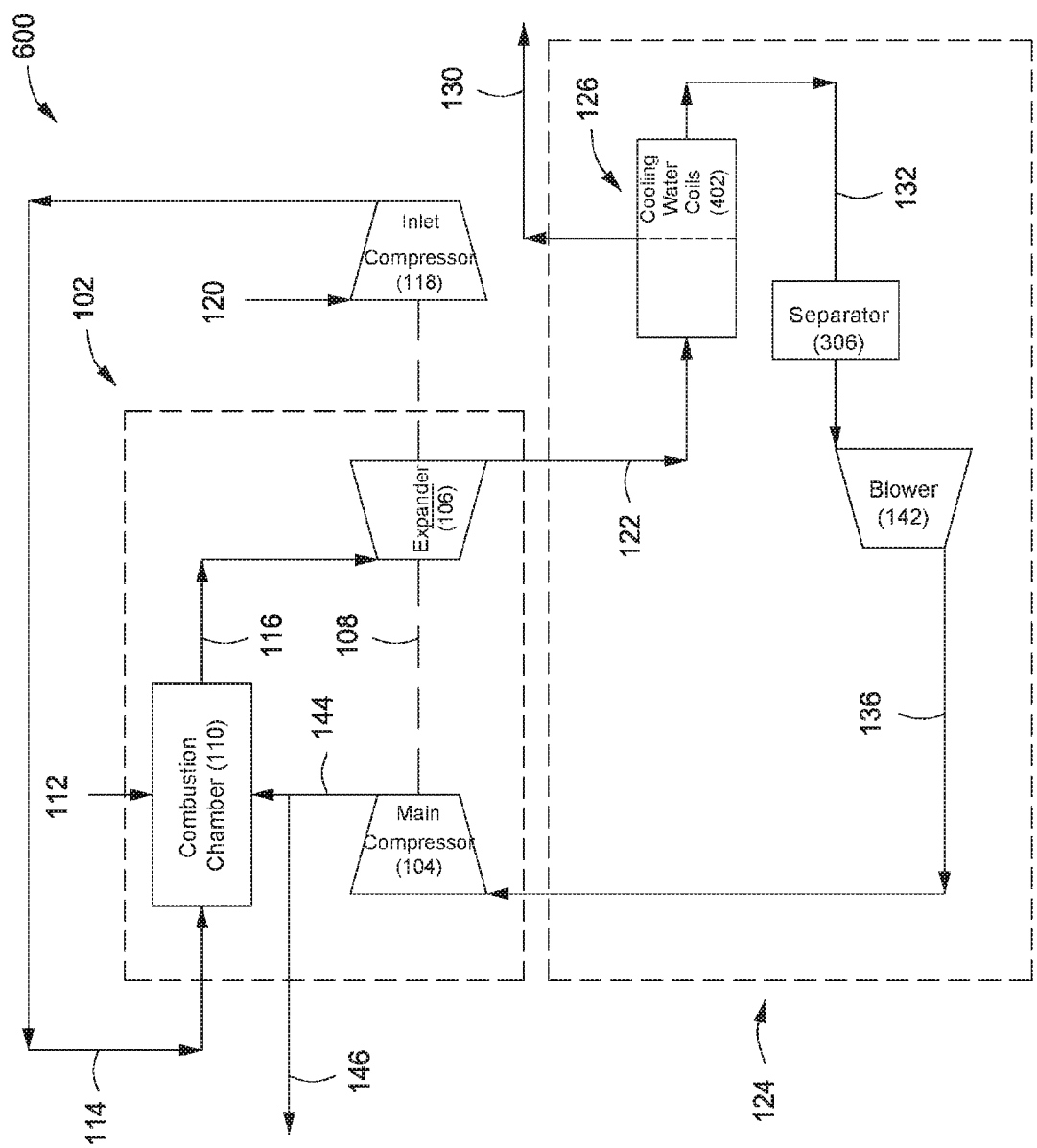
FIG. 6 depicts an integrated system for low emission power generation and enhanced $CO_2$ recovery according to one or more embodiments of the present disclosure, which eliminates the DCC and superheats the inlet to the recycle compressor.

In one or more of the embodiments depicted by FIGS. 1 through 5, the cooled recycle gas stream 140 may be saturated with water. Accordingly, there is a risk that acidic water droplets may form in the stream and cause erosion or corrosion of the blades of main compressor 104. FIG. 6 depicts another embodiment of the low emission power generation system 100 of FIG. 1, embodied as system 600, which is configured to reduce or eliminate the formation of acidic water droplets by superheating the recycle gas stream entering the main compressor 104. FIG. 6 may be best understood with reference to FIGS. 1, 4, and 5. Similar to the system 100 described in FIG. 1, the system 600 includes a gas turbine system 102 supported by or otherwise coupled to an EGR system 124. Similar to the system 400 described in FIG. 4, the EGR system 124 in FIG. 6 also employs cooling water coils 402 in the HRSG 126 and a separator 306 upstream of the blower 142. The system of FIG. 6, however, eliminates the use of a cooling unit or other cooling device downstream of the blower 142 and upstream of the main compressor 104, instead directing compressed exhaust gas stream 136 directly from the blower 142 to the main compressor 104.

In an exemplary method of operation of system 600, cooled exhaust gas stream 132 exits the cooling water coils 402 of the first HRSG 126 at a temperature of approximately 113° F. Exhaust gas stream 132 is superheated by the heat of compression of the blower 142, and compressed exhaust gas stream 136 exits the blower 142 at a temperature of approximately 144° F. In this manner, the configuration of FIG. 6 achieves about 25° F. of superheating. As used herein, the term "superheating" refers to the extent to which the temperature of a gas is above the dew point temperature of that gas. Accordingly, 25° F. of superheating means that the temperature of a gas is 25° F. above its dew point temperature. Compressed exhaust gas stream 136 is routed directly to the main compressor 104 without further cooling. If additional superheating of the gas stream is desired, such additional heating may be obtained by a variety of methods, such as for example by cross exchanging the blower discharge with flue gas upstream of the cooling water coils in the HRSG (not shown). Such a cross exchanger configuration would be similar to air preheaters that are commonly installed with furnaces or incinerators and would decrease the required area of the cooling water coils but would add the additional expense of a large cross exchanger.

Figure 8:
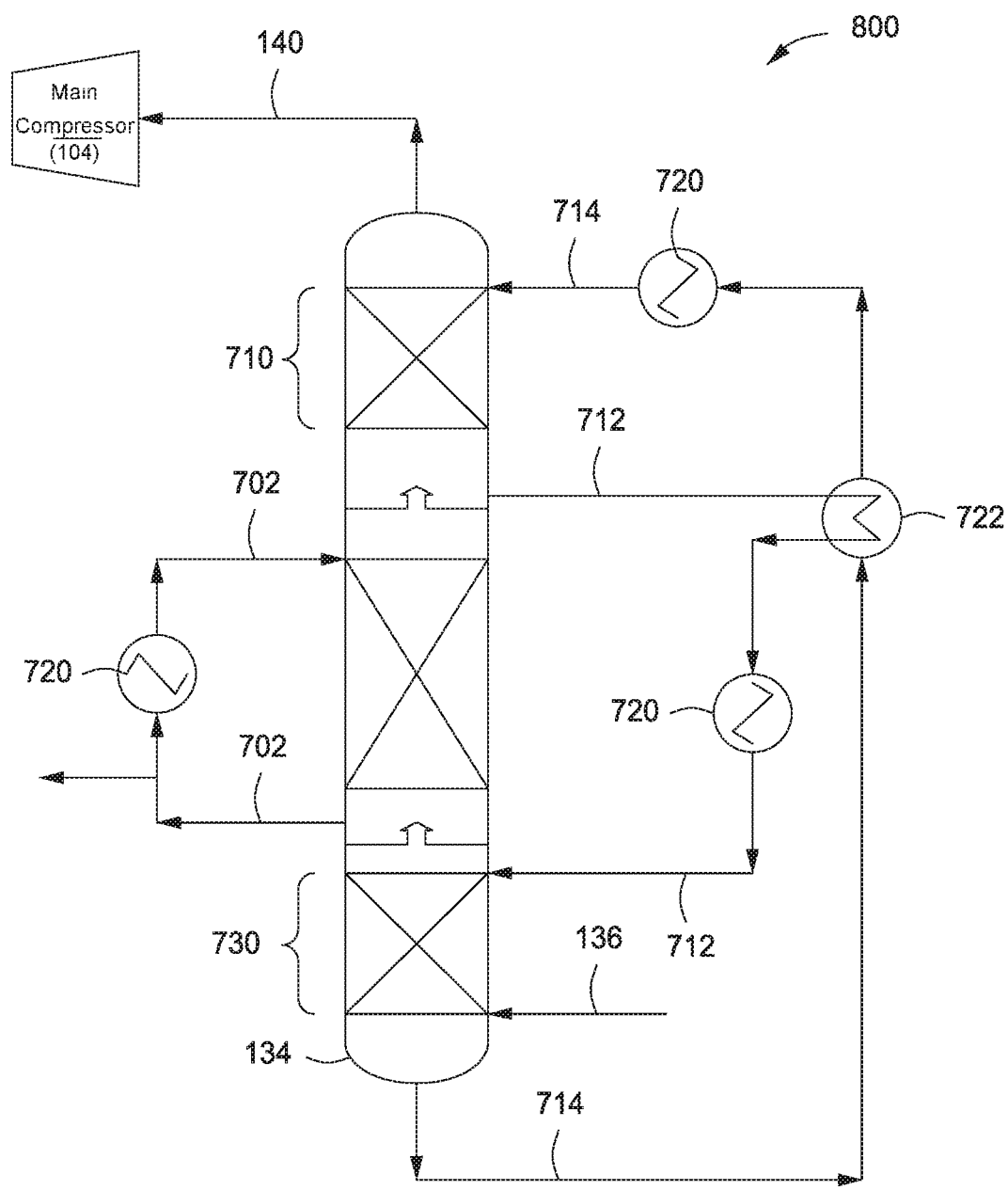
FIG. 8 depicts an integrated system for low emission power generation and enhanced $CO_2$ recovery according to one or more embodiments of the present disclosure incorporating glycol dehydration of the cooled recycle gas with glycol regeneration integrated into the cooling unit.
Figure 9:
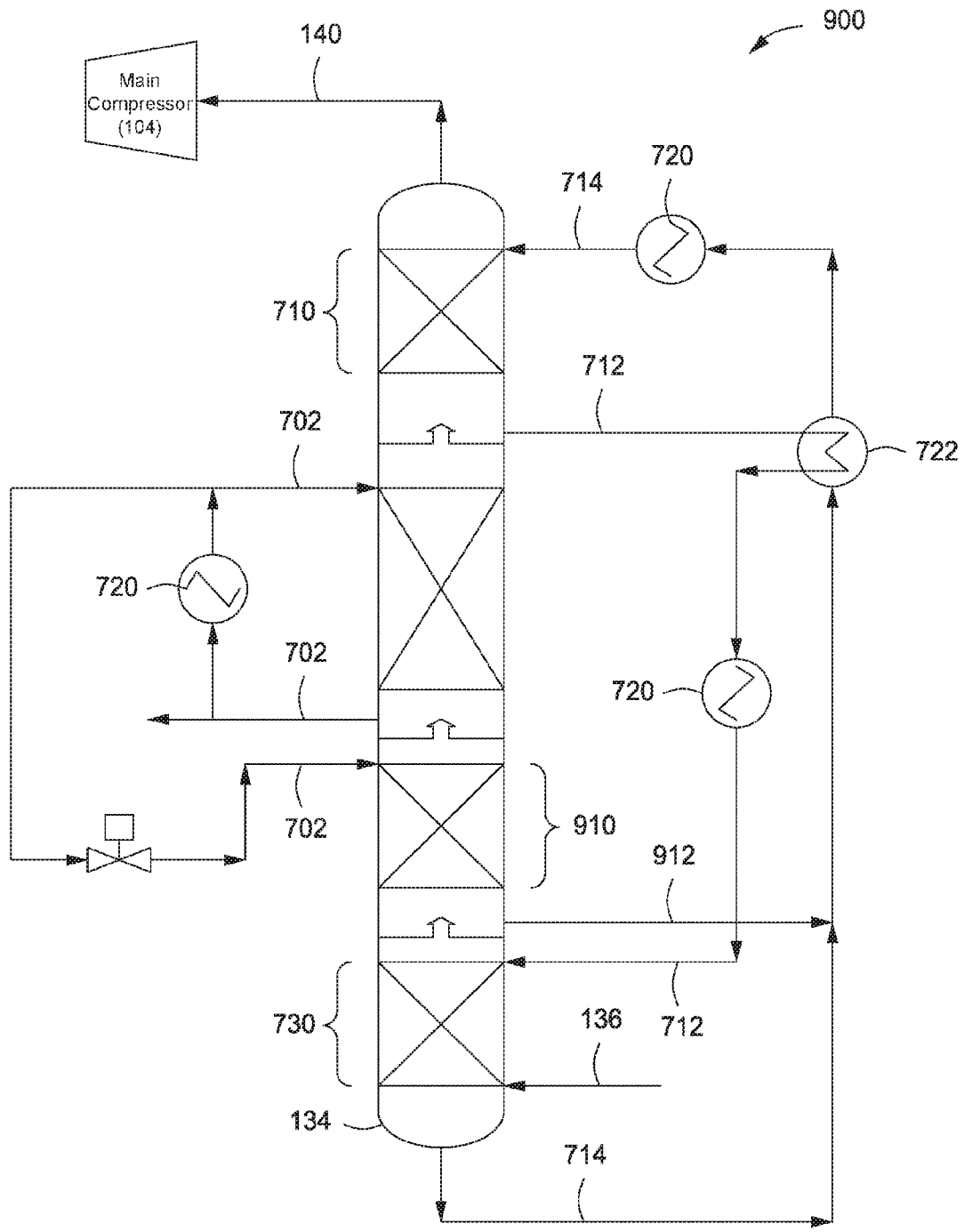
FIG. 9 depicts an integrated system for low emission power generation and enhanced $CO_2$ recovery according to one or more embodiments of the present disclosure incorporating glycol dehydration of the cooled recycle gas with glycol regeneration and a desuperheater integrated into the cooling unit.

The configuration of system 600 in FIG. 6 is intended to reduce or eliminate the formation of acidic water droplets and prevent erosion or corrosion of the blades of the main compressor by superheating the recycle gas stream. FIGS. 7 through 9 depict alternative embodiments of the present invention also intended to reduce or eliminate the formation of acidic water droplets in the recycle gas stream by dehydrating the recycle gas stream using glycol, such as for example triethylene glycol (TEG). In order for such glycol dehydration configurations to be cost effective, waste heat is used to regenerate the glycol. Waste heat may be captured from a variety of sources in the system, such as from the back of one or more heat recovery steam generators (HRSGs) or from compression inter-cooling.

Figure 7A:
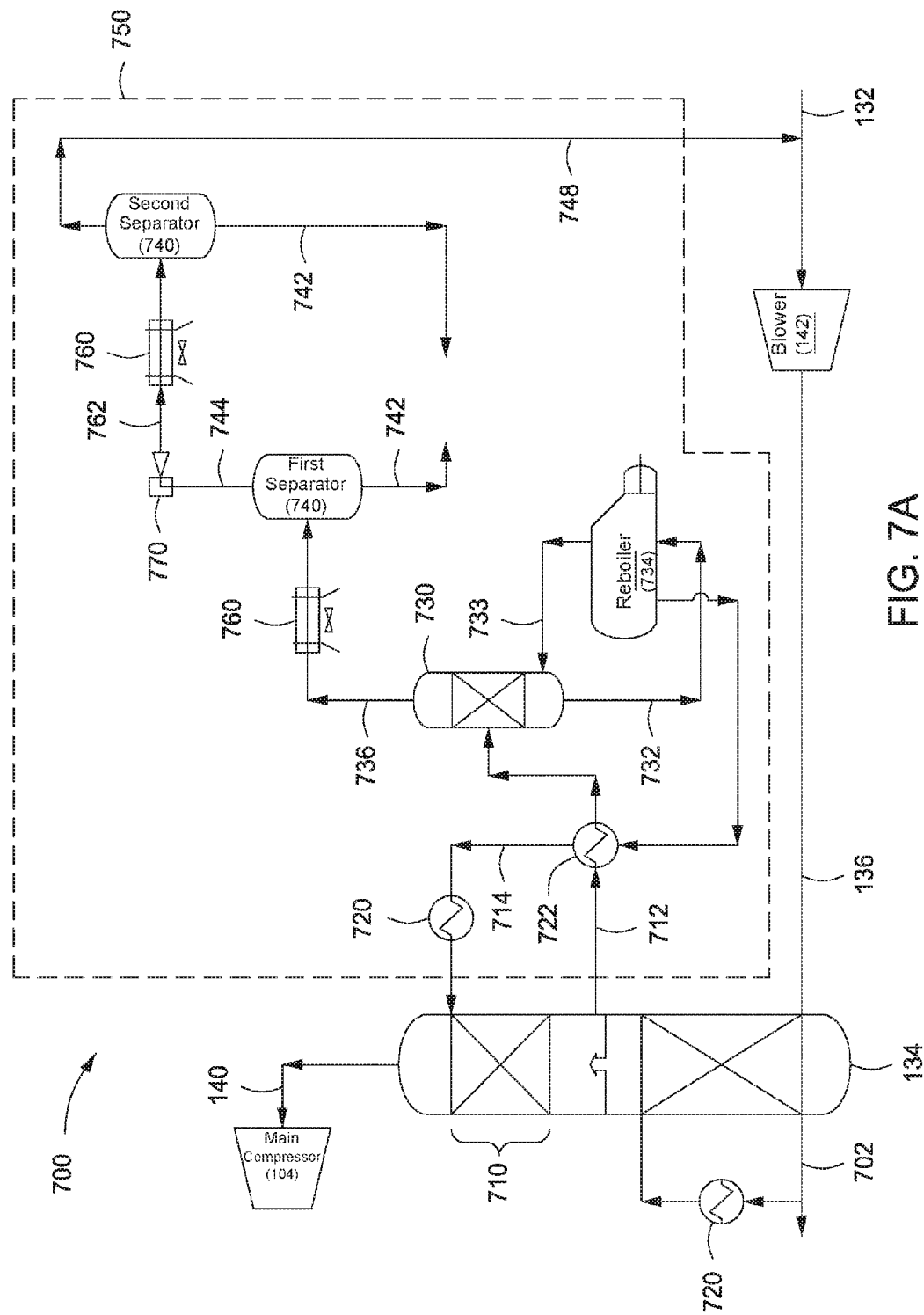
FIG. 7A depicts an integrated system for low emission power generation and enhanced $CO_2$ recovery according to one or more embodiments of the present disclosure incorporating glycol dehydration of the cooled recycle gas.

FIG. 7A depicts an embodiment of a portion of the EGR system 124 of a low emission power generation system such as that depicted in FIG. 1, embodied as system 700, which is configured to reduce or eliminate the formation of acidic water droplets by dehydrating the recycle gas stream entering the main compressor using a glycol contactor section within the cooling unit and regenerating the glycol in a separate glycol vacuum regeneration system. FIG. 7A may be best understood with reference to FIG. 1. In the system 700, cooled exhaust gas stream 132 flows from the HRSG 126 and is directed to the blower 142, where the stream is compressed. Compressed exhaust gas stream 136 exits the blower 142 and is directed to the cooling unit 134, which in one or more embodiments comprises a direct contact cooler (DCC) section utilizing water as the cooling medium. In one or more embodiments, the cooling unit 134 is considered herein to be a direct contact cooler (DCC), but may be any suitable cooling device such as a direct contact cooler, trim cooler, a mechanical refrigeration unit, or combinations thereof. Within the cooling unit 134, the compressed exhaust gas stream 136 is contacted with water to cool the stream. A water dropout stream 702 exits the cooling unit after contacting the gas stream. In one or more embodiments, a portion of water dropout stream 702 may be purged from the system 700, while the remaining portion of the water dropout stream may be cooled using a heat exchanger 720 and recycled to the cooling unit 134 to provide further cooling of the compressed exhaust gas stream 136. In one or more embodiments, the heat exchanger 720 utilizes seawater to provide the required cooling. In the same or other embodiments, additional cooling may be provided by a chilled water cooler (not shown) installed downstream of the heat exchanger 720 in order to counteract the temperature rise associated with dehydration that occurs within the cooling unit 134 when glycol dehydration is employed. The use of a chilled water cooler in this manner may be desirable because by lowering the temperature of the gas fed to the dehydration portion of the process, the recycled exhaust gas temperature is similarly lowered and the power consumption of the blower and main compressor are reduced. Persons of skill in the art will recognize that the use of a chilled water cooler may be desirable in any configuration employing glycol dehydration, including not only the configuration depicted by FIG. 7A but also those depicted in FIGS. 8 and 9 and in any other dehydration system.

The cooling unit 134 further comprises a glycol absorption section 710. In one or more embodiments, the glycol absorption section is an absorption column such as a tray column or a packed column. Once the compressed exhaust gas stream has been cooled with water, the gas enters the glycol absorption section 710 of the cooling unit 134, where water vapor in the exhaust gas is absorbed by the glycol. The resulting cooled recycle gas stream 140, which has been at least partially dehydrated by the glycol, exits the cooling unit 134 and is directed to the main compressor 104. Once the glycol has absorbed the water from the exhaust gas, it is withdrawn from the glycol absorption section 710 via rich glycol stream 712 and is directed to a vacuum regeneration system 750.

Within the vacuum regeneration system 750, rich glycol stream 712 is heated in a cross exchanger 722 and fed to a glycol regeneration column 730, where the glycol is thermally regenerated. Regenerator overhead stream 736 exits the top of glycol regeneration column 730, while the regenerated glycol stream 732 exits the bottom of the column and is directed to a reboiler 734. From the reboiler 734, a glycol vapor stream 733 is returned to the glycol regeneration column and lean glycol stream 714 is directed through the cross exchanger 722 and optionally one or more heat exchangers 720 before being returned to the glycol absorption section 710. Regenerator overhead stream 736, which comprises water vapor and some residual exhaust gases, is cooled in a pre-condensing cooling unit 760 and directed to a first separator 740, where a substantial amount of the water in the overhead stream is removed and exits the system via a water purge stream 742. Exhaust gases exit the first separator 740 via stream 744 and are directed to a steam ejector 770. Within the steam ejector 770, steam at an elevated pressure creates a vacuum that draws in exhaust gas stream 744. The steam ejector 770 may use low pressure, intermediate pressure, or high pressure steam, and may be a single stage or multiple stage ejector. Alternately, in one or more embodiments not depicted in FIG. 7A, a vacuum pump may be used in place of a steam ejector to create the desired level of vacuum in the vacuum regeneration system 750.

Ejector outlet stream 762, comprising exhaust gases and water vapor, exits the ejector 770 and is cooled in an after-cooler cooling unit 760 before being separated in a second separator 740 to remove the motive steam from the ejector and any other residual water from the stream. The cooling units 760 may be air or water coolers, depending upon the temperature requirements and other parameters of the vacuum regeneration system 750. In one or more embodiments herein, the pressure drop across the pre-condenser cooling unit and the after-cooler cooling unit is less than or equal to about 2 psi, or less than or equal to about 1.5 psi, or less than or equal to about 1 psi, or less than or equal to about 0.5 psi. The separators 740 may be any type of separation unit designed to remove water from the exhaust gases, such as for example a condenser, gravity separator, reflux drum, or the like. Water removed from the ejector outlet gases in the second separator 740 is removed from the system via a water purge stream 742, while the resulting dry exhaust gas exits the separator and is recycled to a point upstream of the blower 142 via stream 748. In one or more embodiments, water purge streams 742 each have a glycol concentration of less than 0.5, or less than 0.25, or less than 0.1 parts per million by volume (ppmv).

At atmospheric operating pressure, the temperature requirement to reboil the regenerated glycol stream 732 exceeds 300° F. Accordingly, in one or more embodiments, it is desirable to operate the regeneration system 750, and particularly the glycol regeneration column 730, under vacuum conditions. In this manner, low level waste heat may be used to regenerate the glycol rather than steam. As the pressure in the glycol regeneration column 730 is lowered, the reboiler temperature required to vaporize water out of the glycol also drops, while the heat duty remains relatively constant. Therefore, the vacuum pressure can be selected based upon the temperature of the available external heat source (within the limitations of the column design), the parameters of the vacuum generating device, and the available overhead cooling temperature.

Figure 7B:
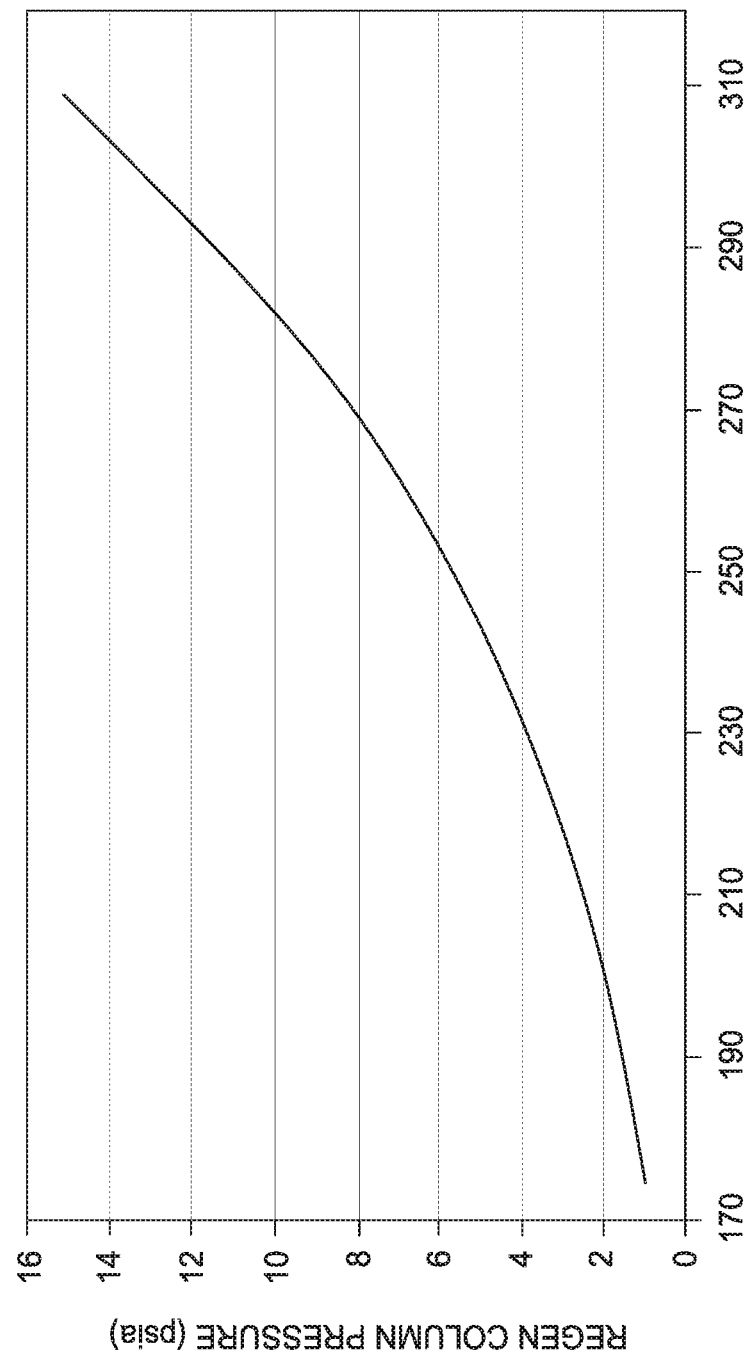
FIG. 7B illustrates the relationship between the pressure and the external heat source temperature in a triethylene glycol (TEG) regeneration system.
Figure 7C:
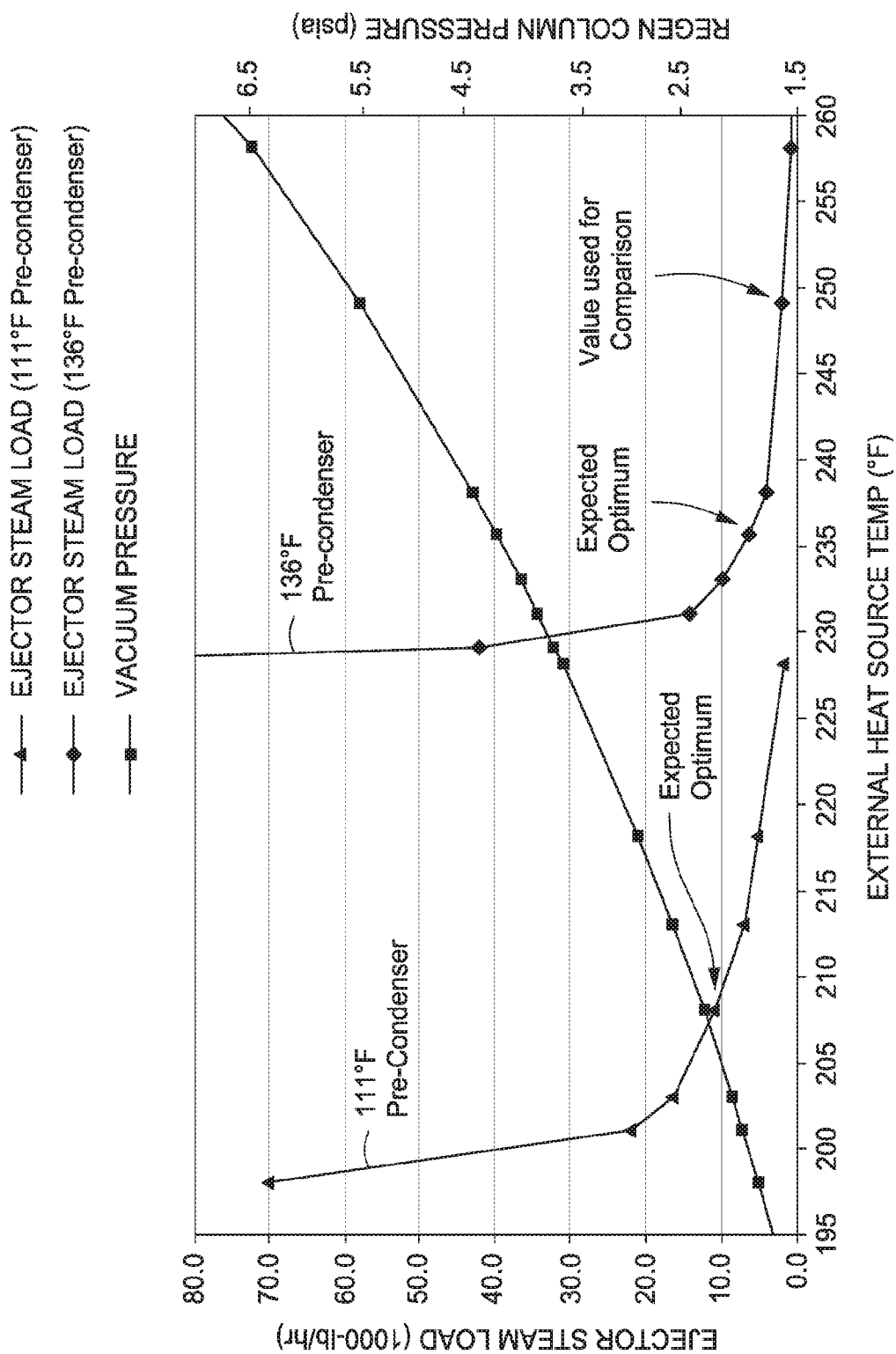
FIG. 7C illustrates the relationship between the ejector steam load and the external heat source temperature in a TEG regeneration system.

FIG. 7B shows the correspondence between the pressure of a TEG regeneration column and the temperature of the external reboiler heat source, assuming an 18° F. heat exchanger approach temperature. FIG. 7C demonstrates the relationship between the external heat source temperature and the column vacuum pressure and how that relates to the steam load of the ejector for two different pre-condenser overhead cooling temperatures, again assuming an 18° F. heat exchanger approach temperature. The "expected optimums" indicated in FIG. 7C indicate a balance between the external heat source temperature and the ejector steam required to reach the necessary vacuum. By moving further left along the curves, a lower heat source temperature may be used, but more ejector steam would be required at the same overhead cooling temperature.

FIG. 8 depicts another embodiment of the low emission power generation system 100 of FIG. 1, embodied as system 800. FIG. 8 may be best understood with reference to FIGS. 1 and 7. Similar to the system 700 described in FIG. 7A, the system 800 incorporates glycol dehydration to reduce or eliminate the formation of acidic water droplets in the recycled exhaust gas stream. Instead of a separate vacuum regeneration system, however, the system 800 of FIG. 8 incorporates a glycol regeneration section 730 within the cooling unit 134, using the superheat of the compressed exhaust gas stream 136 to regenerate the glycol. In this manner, the external heating duty of the system 800 is reduced, although some additional heating via heat exchangers 720 may still be required.

While using the superheated inlet gas to the cooling unit to regenerate the glycol reduces the external heating duty in the system 800, it also leads to potentially unacceptable glycol losses. Vaporized glycol in the regeneration section 730 is carried directly into the cooling section of the cooling unit 134, where it may be condensed and removed in the water dropout stream 702. The resulting costs associated with supplying make-up glycol may make the configuration depicted in FIG. 8 undesirable in some situations. One way to address these potential glycol losses is shown in FIG. 9, which depicts another embodiment of the low emission power generation system 100 of FIG. 1, embodied as system 900. FIG. 9 may be best understood with reference to FIGS. 1, 7, and 8. Similar to the system 800 described in FIG. 8, the system 900 incorporates glycol dehydration to reduce or eliminate the formation of acidic water droplets in the recycled exhaust gas stream and includes a glycol regeneration section 730 within the cooling unit 134. Additionally, however, the system 900 of FIG. 9 incorporates a desuperheating section 910 between the glycol regeneration section 730 and the cooling section in the cooling unit 134. The desuperheating section 910 cools the exhaust gas to or near water saturation temperature and condenses most of the glycol, which is removed from the desuperheating section 910 via condensed glycol stream 912 and added to lean glycol stream 714. In such configurations, the desuperheating section 910 should be controlled so that large quantities of water do not condense along with the glycol. In one or more embodiments of the present invention, the total pressure drop from the blower 142 to the inlet of the main compressor 104 in the system 900 depicted in FIG. 9 is less than or equal to about 2.0 psi, or less than or equal to about 1.5 psi, or less than or equal to about 1.0 psi.

It should be appreciated by those skilled in the art that, although glycol dehydration is exemplified and described with reference to FIGS. 7A, 8, and 9, any suitable dehydration method may be employed herein and is considered to be within the scope of the invention. For example, dehydration methods employing mole sieves or methanol may be used in place of the glycol dehydration described herein.

Figure 10:
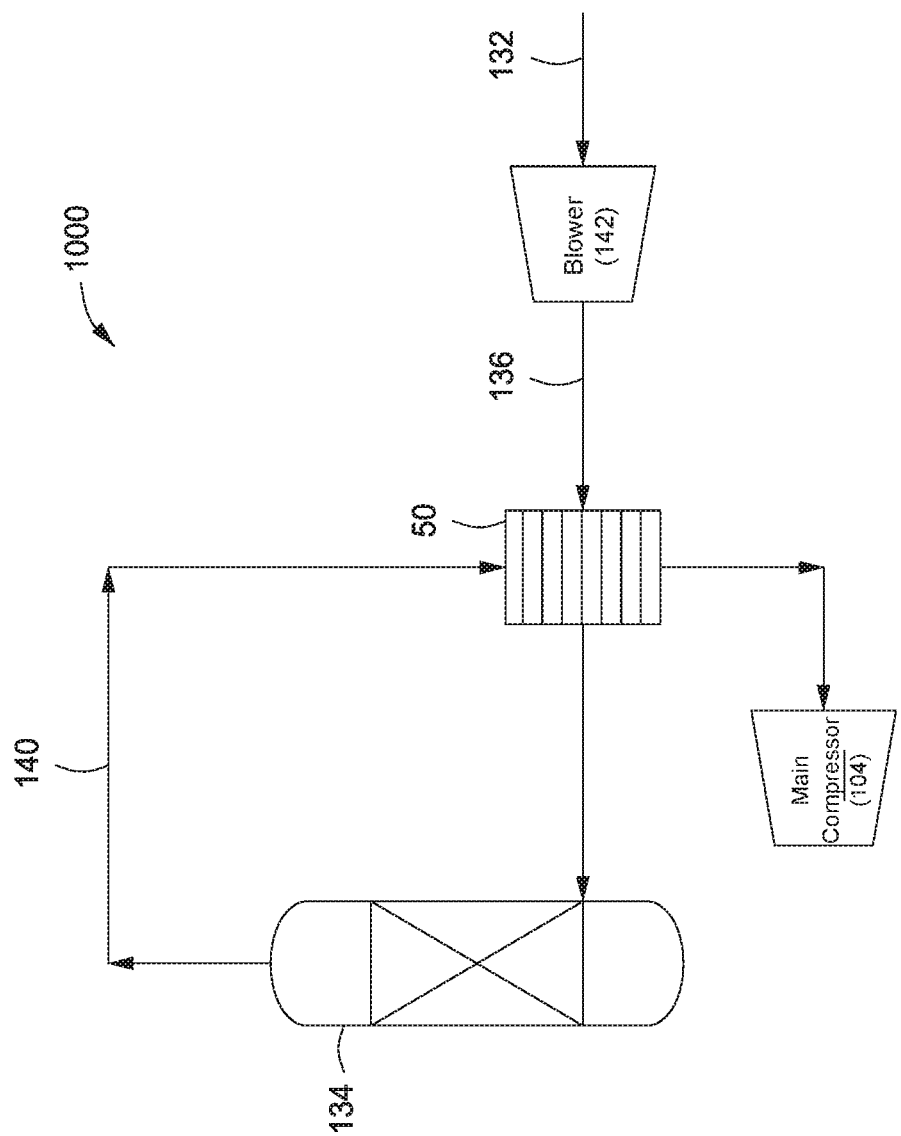
FIG. 10 depicts an integrated system for low emission power generation and enhanced $CO_2$ recovery according to one or more embodiments of the present disclosure incorporating a feed/effluent cross exchanger across the recycle gas cooling equipment.

A further configuration that may be effective for reducing or eliminating the formation of acidic water droplets in the recycled exhaust gas stream is illustrated in FIG. 10, which depicts another embodiment of the low emission power generation system 100 of FIG. 1, embodied as system 1000.

FIG. 10 may be best understood with reference to FIG. 1. Unlike the configurations of FIGS. 7 through 9, the system 1000 of FIG. 10 does not employ dehydration of the exhaust gas but rather incorporates a feed/effluent exchanger 50 across the cooling unit 134 to achieve a desired dew point margin for the temperature of the cooled recycle gas stream 140. In one or more embodiments, the desired dew point margin of the cooled recycle gas stream may be about 50° F., or about 45° F., or about 40° F., or about 35° F., or about 30° F., or about 25° F., or about 20° F., or about 15° F. above the dew point of the gas. The configuration depicted in FIG. 10 may result in an increase in the power consumption of the blower 142 and the main compressor 104 due to a higher exhaust gas temperature compared to embodiments that use glycol dehydration. A benefit of the system 1000, however, is that the configuration reduces the amount of required equipment, which accordingly results in lower capital costs and less complexity in the system.

EXAMPLES

Example 1

A study was performed to vary the exhaust gas recycle circuit of a low emission turbine. Several configurations corresponding to FIGS. 1-6 were simulated, and the results are reported in Table 1. The simulations and corresponding results are based on a single train case utilizing a frame 9FB combustion turbine generator (CTG) with air as the oxidant. The main air compressor (MAC) was assumed to be a single axial machine.

The following assumptions were used in all of the simulations of Example 1. The polytropic efficiency of the MAC was assumed to be 91% (no compressor curves used in simulation) and the polytropic efficiency of the exhaust gas blower was assumed to be 88.6%. The combustor outlet temperature and the expander inlet temperature were assumed to be 3200° F. and 2600° F., respectively. The minimum DCC outlet temperature was assumed to be 100° F. The flue gas battery limit pressure was assumed to be 1900 psig.

CTG performance was predicted using correlations based on recycle compressor pressure ratio and recycle compressor exit volume. To ensure the predicted performance was within the known capabilities of the CTG, the following CTG limitations were maintained: maximum expander power=588.5 MW, maximum shaft coupling torque (expander power−compressor power)=320 MW, maximum expander outlet Mach number=0.8, maximum compressor inlet Mach number=0.6, minimum compressor outlet flow=126,500 actual cubic feet per minute (acfm) to prevent stalling (compressor exit flow rate after coolant removed).

The simulation results are provided in Table 1 below.

TABLE 1

| Configuration | FIG. 1 | FIG. 2 | FIG. 3 | FIG. 4 | FIG. 5 | FIG. 6 (with 25° F. superheat) | FIG. 6 (with 40° F. superheat) |
|---|---|---|---|---|---|---|---|
| Heat rate (Btu/net kWh) | 10,623 | 10,622 | 10,615 | 10,564 | 10,595 | 10,577 | 10,577 |
| Fuel gas rate (MSCFD) | 74 | 74 | 74 | 74 | 75 | 74 | 74 |
| Fuel gas rate (MMBtu/hr) | 2,994 | 3,004 | 3,004 | 3,004 | 3,047 | 3,011 | 2,992 |
| Fuel gas, higher heating value (Btu/SCF) | 975 | 975 | 975 | 975 | 975 | 975 | 975 |
| Fuel gas, lower heating value (Btu/SCF) | 878 | 878 | 878 | 878 | 878 | 878 | 878 |
| Oxidant total flow rate (MSCFD) | 695 | 698 | 698 | 698 | 708 | 700 | 695 |
| CTG gross power production (MW) | 580.5 | 580.5 | 580.5 | 580.6 | 594.5 | 592.8 | 593.0 |
| Comb. turbine gen. loss and aux. load (MW) | 6.9 | 6.9 | 6.9 | 6.9 | 7.1 | 7.1 | 7.1 |
| STG gross power production (MW) | 187.2 | 189.5 | 187.2 | 187.5 | 192.2 | 196.8 | 198.9 |
| Exhaust gas recycle compression (MW) | 263.4 | 263.3 | 263.3 | 263.4 | 274.0 | 282.2 | 286.9 |
| Inert gas compression power req. (MW) | 71.4 | 71.7 | 71.7 | 71.6 | 72.1 | 71.5 | 71.0 |
| Air compression (MW) | 126.9 | 126.7 | 126.7 | 126.7 | 129.6 | 127.8 | 127.1 |
| Exhaust blower (MW) | 11.6 | 13.1 | 10.6 | 9.9 | 11.8 | 12.2 | 13.0 |
| Boiler feed water pump, est. (MW) | 2.8 | 2.8 | 2.8 | 2.8 | 2.8 | 2.8 | 2.8 |
| DCC Pump (MW) | 2.6 | 2.5 | 2.5 | 2.0 | 1.3 | 1.1 | 1.1 |
| Dehydration power req. (MW) | 0.2 | 0.2 | 0.2 | 0.2 | 0.2 | 0.2 | 0.2 |
| Net power export (MW) | 281.9 | 282.8 | 283.0 | 284.4 | 287.6 | 284.7 | 282.8 |

As shown in Table 1, the following results were observed, using the configuration of FIG. 1 as the base case for comparison. The configuration of FIG. 2 increases power production in the steam turbine generator (STG) by approximately 2 MW. However, this benefit may be offset by the higher power consumption of the EGR blower associated with a higher suction temperature. The heat rate, power export and inert gas product are essentially identical to FIG. 1. The configuration of FIG. 3 reduces the EGR blower power consumption by approximately 1 MW. In the configuration of FIG. 4, the suction temperature to the EGR blower, and therefore blower power consumption, are reduced by cooling the flue gas against cooling water in the HRSG. DCC water circulation is also lower as the cooling duty is reduced. The net effect is <1% reduction in the system heat rate. Due to the addition of cooling water coils to the back of the HRSG, higher metallurgy materials may be employed to handle the acidic water that condenses. In one or more embodiments, the HRSG may include a drain for condensed liquids.

In the configurations of FIGS. 5 and 6, the suction temperature to the EGR blower, and therefore the relative blower power consumption, are reduced by cooling the flue gas against seawater in the HRSG. The power associated with pumping water to cool the exhaust gas is also reduced compared to FIG. 1. The net effect is <0.5% reduction in the system heat rate. In the case of FIG. 6, the use of superheated gas entering the main compressor provides a potential cost savings for the DCC.

The overall results shown in Table 1 indicate that the options depicted by FIGS. 1 through 6 have a minor impact on the system heat rate. However, the options that consider elimination of the DCC may provide substantial capital cost savings. In particular, any option that eliminates the DCC while still providing a superheated gas to the main compressor may save substantial capital cost. The opportunity for cost savings is improved if the superheat provided by blower compression (about 25° F.) is acceptable. Otherwise the addition of a large, low pressure gas heat exchanger may be utilized to achieve a 40° F. margin from the gas dew point.

Example 2

A second study was performed to vary the exhaust gas recycle circuit of a low emission turbine. Several configurations corresponding to FIGS. 7-10 were simulated, and the results are reported in Table 3, along with comparison to a base case having the configuration of FIG. 1. The simulations and corresponding results are based on a single train case utilizing a frame 9FB combustion turbine generator (CTG) with air as the oxidant. The main air compressor (MAC) was assumed to be a single axial machine.

The following additional assumptions set forth in Table 2 were used in all of the simulations of Example 2.

TABLE 2

| | |
|---|---|
| Polytropic efficiency of main compressor | 86.14% |
| Polytropic efficiency of centrifugal booster | 85.6% |
| Polytropic efficiency of EGR compressor (no compressor curves used in simulation) | 92.5% |
| Polytropic efficiency of exhaust gas blower | 88.6% |
| Combustor outlet temperature | 3200° F. |
| Expander inlet temperature | 2600° F. |
| Polytropic efficiency of expander | 84.2% |
| Minimum DCC outlet temperature | 100° F. |
| TEG absorber column pressure drop | 0.4 psi |

TABLE 2-continued

| | |
|---|---|
| Total pressure drop from exhaust blower to main compressor | 1 psi |
| Temperature approach for external heat source and cross exchangers | 18° F. |
| Temperature of lean TEG returned to TEG absorption column (assuming 5° F. approach with seawater cooling) | 98° F. |
| HRSG low pressure boiler approach temperature | 22° F. |
| HRSG intermediate pressure boiler approach temperature | 26° F. |
| HRSG high pressure boiler approach temperature | 26° F. |
| HRSG high pressure economizer approach temperature | 15° F. |
| For vacuum regeneration cases (FIG. 7a): | |
| Target reflux ratio of TEG regeneration column | 0.1 |
| Regeneration column pressure drop | 0.2 psi |
| Temperature of overhead TEG regeneration gas recycled to exhaust gas blower | 136° F. |
| Pressure drop of overhead TEG regeneration gas air coolers | 1 psi |

In addition to the above assumptions, in the vacuum regeneration cases it was also assumed that condensable gases were removed by cooling and separation before the steam ejector and that the steam ejector was a single stage ejector with no interstage condenser. Rates for the steam ejector were based on design curves published by DeFrate and Hoerl, *Chem. Eng. Frog.*, 55, Symp. Ser. 21, 46 (1959).

After modifying the case specific variables, the fuel gas and air flow rates, diluent flow rates, and DCC outlet temperature/pressure were adjusted to achieve the EGR compressor and expander volume limitations of $1.122 \times 10^6$ acfm and $3.865 \times 10^6$ acfm, respectively. Following this, the steam flow rates were adjusted to achieve consistent HRSG temperature approaches and a flue gas outlet temperature from the HRSG of about 200° F.

The integrated regeneration dehydration cases with and without a desuperheater were solved by adjusting the inlet temperature of the rich TEG to the regeneration section until the desired dew point was achieved for the specific TEG rate. In cases with a desuperheater, the desuperheater outlet temperature was controlled to be 5° F. above the dew point using cooling water flow. Numerous iterations are required to integrate the dehydrated gas return to the EGR compressor as the recycled exhaust gas composition changes.

The vacuum regeneration dehydration cases (i.e. cases with a separate regeneration column) were solved by selecting a starting reboiler temperature and then adjusting the vacuum pressure to achieve the desired dew point for the specific TEG rate. Alternately, a starting vacuum pressure may be selected and then the reboiler temperature adjusted to achieve the desired dew point. Once the vacuum pressure is determined, the amount of steam required to achieve that vacuum must be calculated. Using the design curves for optimum single-stage ejectors, the steam entrainment ratio is determined to achieve the desired compression. This steam flow is incorporated into the simulation as a debit from the HRSG and a credit to the overhead flow. Numerous iterations are required to integrate both the non-condensed regeneration overhead back to the EGR booster and the dehydrated gas return to the EGR compressor as the recycled exhaust gas composition changes.

The simulation results are provided in Table 3.

TABLE 3

| Configuration | FIG. 1 | FIG. 8 | FIG. 8 | FIG. 9 | FIG. 8 | FIG. 7A | FIG. 7A | FIG. 7A | FIG. 10 | FIG. 7A (w/chilled cooling unit overhead) |
|---|---|---|---|---|---|---|---|---|---|---|
| Dew point suppression (° F.) | — | 40 | 40 | 40 | 30 | 40 | 40 | 30 | 40 | 40 |
| TEG rate (gpm/lb $H_2O$) | | 5 | 2 | 2 | 2 | 3.5 | 2 | 2 | — | 3.5 |
| Fuel gas rate, higher heating value (MMBtu/hr) | 6,543 | 6,495 | 6,461 | 6,461 | 6,483 | 6,495 | 6,464 | 6,484 | 6,401 | 6,494 |
| Heat rate, higher heating value (Btu/net kWh) | 16,331 | 16,133 | 16,332 | 16,337 | 16,310 | 16,107 | 16,339 | 16,316 | 17,578 | 17,343 |
| Annual TEG cost at $9.47/gal ($MM) | — | 57.1 | 46.8 | 2.0 | 21.0 | 2.4 | 3.6 | 2.5 | | 1.8 |
| Flue gas (MSCFD) | 1,337 | 1,327 | 1,320 | 1,320 | 1,325 | 1,327 | 1,321 | 1,325 | 1,308 | 1,327 |
| Low pressure steam to desalinization (1000 lb/hr) | 3,247 | 3,216 | 3,247 | 3,247 | 3,247 | 3,220 | 3,245 | 3,244 | 3,300 | 2,635 |
| Combustion turbine generator gross power production (MW) | 1,148.6 | 1,140.0 | 1,149.8 | 1,149.8 | 1,149.7 | 1,148.4 | 1,150.2 | 1,149.8 | 1,150.3 | 1,140.8 |
| Steam turbine generator gross power production (MW) | 255.5 | 255.1 | 257.3 | 257.3 | 256.9 | 255.0 | 257.0 | 256.6 | 261.7 | 228.0 |
| Exhaust gas recycle compression (MW) | 538.0 | 528.8 | 549.2 | 549.2 | 546.2 | 537.0 | 548.9 | 545.8 | 573.0 | 529.7 |
| Flue gas compression power requirement (MW) | 146.0 | 146.6 | 142.7 | 142.7 | 143.5 | 145.2 | 142.8 | 143.4 | 141.3 | 146.4 |
| Exhaust blower (MW) | 16.8 | 14.7 | 19.8 | 19.8 | 18.8 | 16.2 | 19.9 | 19.0 | 37.1 | 14.7 |
| Net power export (MW) | 400.7 | 402.6 | 395.6 | 395.5 | 397.5 | 403.2 | 395.6 | 397.4 | 364.2 | 374.5 |

The overall simulation is generally unchanged by the specific vacuum pressure of the regeneration tower as long as the overhead cooling temperature and steam ejector are properly selected. As such, the power cycle data found in Table 3 applies regardless of the regeneration overhead cooling and external heat source temperatures. The selection of the vacuum pressure, external heat source temperature and overhead cooling temperature is performed separately.

As shown in Table 3, the system heat rates are largely unaffected by the use of TEG dehydration in all of the evaluated configurations. Except for the case of FIG. 7A incorporating chilled water used to cool the cooling unit overhead, the heat rate of all of the evaluated dehydration configurations varies less than about 1.4% from the base case (FIG. 1) without dehydration. The largest variation is found in the cases with higher TEG rates.

The overall effects of dehydration and the associated TEG flow rate are summarized in Table 4

TABLE 4

| Trends | Temperature to EGR Compressor | Blower Power | Fuel Gas, Air, and Purge Rates | Water Removal/ Working Fluid Density* | CTG Power | EGR Power | STG Power |
|---|---|---|---|---|---|---|---|
| Addition of Dehydration | ↑ | ↑* | ↓ | ↑ | ↑* | ↑* | ↑* |
| Increasing TEG Rate | ↓ | ↓ | ↑ | ↑ | ↓ | ↓ | ↓ |

* general trend, some exceptions

In cases incorporating TEG dehydration, the gas temperature rise across the dehydration absorber increases the inlet temperature to the main compressor, resulting in additional power consumption and higher inlet actual cubic feet per minute (acfm). In order to meet the main compressor inlet acfm limit, a higher inlet pressure is required. This increases the power consumption of the exhaust blower providing this pressure.

While the power consumption is increased to recycle warmer exhaust gas, it is counterbalanced by the removal of water from the exhaust gas prior to compression, as well as by lower fuel gas firing in the combustor. Water removal increases the density of the circulating fluid, which increases the combustion turbine generator (CTG) power and the heat recovery steam generator (HRSG) duty. The increase in density also lowers the inlet acfm to the main compressor, which then must be balanced by providing the gas at a higher inlet temperature or at a lower inlet pressure if the temperature rise alone is insufficient. Since the recycled exhaust gas is warmer, less fuel gas is required to reach temperature in the combustor. Less fuel gas leads to lower compression power of both the combustion air compressor and the flue gas compressor, but also leads to about 1% lower flue gas production. This reduced power use as well as the lower fuel gas rate helps compensate for the higher power consumption in recycling the exhaust gas. Taken together, these effects result in TEG dehydration causing no substantial change in the system heat rate.

In the TEG dehydration configurations, dew point suppression is achieved by the TEG removing water from the exhaust gas stream. Additionally, there is also a temperature rise across the absorber which helps suppress the dew point at the outlet. In cases with higher TEG flows, a larger portion of heat is absorbed by the TEG itself, resulting in a lower gas temperature rise across the absorber. This means that less dew point suppression is provided by the temperature rise and therefore additional water must be absorbed by the TEG. Accordingly, the system heat rate improves as the benefits of water removal increase, while the additional power required for the higher main compressor inlet temperature is mitigated. Power generation changes are minimal, but there is generally a small increase in both CTG and steam turbine generator (STG) power production. The increase in CTG power generation is the result of higher inlet density and thus more mass flow through the expander. The density increase is explained in part by the lower water content, but it is also influenced by a higher pressure from the recycle compressor.

The increases in STG power generation at lower TEG rates are due to higher steam production in both the HRSG and purge gas waste heat boilers. The HRSG duty increases due to the higher temperature and mass flow of the flue gas to the HRSG. The combined purge gas boiler duties increase due to the higher purge gas temperature, which overcomes the lower flow. These increased duties offset the reduced duty in the combustion air boilers as well as any ejector steam used in the vacuum regeneration cases. However, as the TEG rate increases, ejector steam use increases while the flue and purge gas temperatures decrease. Therefore, the STG power starts to decrease at higher TEG rates. The additional power involved in pumping the TEG at 2 gal TEG/lb $H_2O$ is approximately 0.7 MW, and at 5 gal TEG/lb $H_2O$ the additional power is approximately 1.7 MW. However, this power consumption does not have a significant impact on the heat rate.

To evaluate the differential cost associated with a specific dew point, dew point margins of 30° F. and 40° F. were evaluated for the configurations of FIGS. 7A and 8 at a TEG rate of 2 gal TEG/lb $H_2O$. When the dew point margin is lowered, less water must be removed from the circulating TEG, reducing the reboiler duty and the overhead flow. The resulting reboiler duty of the vacuum regeneration tower is decreased by 13% (38 MMBtu/hr) and the required external heating temperature decreases by 19° F. The tower overhead cooling duty is decreased by 19.8% (39 MMBtu/hr) and the lean TEG cooling duty is decreased by 10.8% (26 MMBtu/hr). There is also a small (3.3%) decrease in the ejector steam load. Additionally, as less water is removed in the absorber, the gas temperature rise in the absorber is also lower. With a lower gas temperature in the absorber overhead, less TEG is vaporized and carried on to the DCC. Therefore, TEG losses are reduced by 31%.

A higher TEG rate (gpm/lb $H_2O$) reduces the overhead temperature from the dehydration absorber and reduces the unrecoverable loss of TEG from the absorber overhead, but increases the external waste heat and cooling requirements. A higher TEG rate also increases the ejector steam duty and waste water purge rates as more water is being removed. Additionally, in cases without a separate regeneration tower, TEG is vaporized in the DCC integrated regeneration section. Therefore, it may be preferable to minimize the TEG rate.

When TEG dehydration is employed, it is possible that the TEG may degrade in the presence of unreacted oxygen found in the recirculating gas leading to organic acid formation, which lowers the pH of the TEG. As a result, there is the potential for accelerated corrosion of carbon steel components resulting from this pH decrease. For example, entrained TEG from the DCC overhead may be introduced into the main compressor. Without oxygen degradation, the TEG droplets typically have a pH of about 6.1. If oxygen degradation of the TEG occurs, the pH of the droplets will be reduced. Therefore, in one or more embodiments of the present invention, an inhibited or buffered TEG (such as Norkool Desitherm, available commercially from The Dow Chemical Co.) may be used in order to reduce or eliminate the potential for corrosion as a result of this mechanism.

While the present disclosure may be susceptible to various modifications and alternative forms, the exemplary embodiments discussed above have been shown only by way of example. Any features or configurations of any embodiment described herein may be combined with any other embodiment or with multiple other embodiments (to the extent feasible) and all such combinations are intended to be within the scope of the present invention. Additionally, it should be understood that the disclosure is not intended to be limited to the particular embodiments disclosed herein. Indeed, the present disclosure includes all alternatives, modifications, and equivalents falling within the true spirit and scope of the appended claims.

What is claimed is:

1. An integrated system comprising:
   a gas turbine system comprising a combustion chamber configured to combust one or more oxidants and one or more fuels in the presence of a compressed recycle stream, wherein the combustion chamber directs a first discharge stream to an expander to generate a gaseous exhaust stream and at least partially drive a main compressor, wherein the one or more oxidants and the one or more fuels are separately provided to the combustion chamber so as to be in a stoichiometric ratio of between 0.9:1 and 1.1:1 in the combustion chamber; and
   an exhaust gas recirculation system, wherein the main compressor compresses the gaseous exhaust stream and thereby generates the compressed recycle stream;
   wherein the exhaust gas recirculation system comprises (i) at least one cooling unit configured to receive and cool the gaseous exhaust stream, (ii) at least one blower configured to receive and increase the pressure of the gaseous exhaust stream before directing a cooled recycle gas to the main compressor, (iii) a second cooling unit configured to receive the gaseous exhaust stream from the at least one blower and to adjust a temperature and lower a dew point of the gaseous exhaust stream to the main compressor thereby generating the cooled recycle gas, and (iv) a feed/effluent cross exchanger in series with the second cooling unit configured to adjust the temperature of the cooled recycle gas to achieve a dew point margin of at least about 20° F.

2. The system of claim 1, wherein the at least one cooling unit is a heat recovery steam generator (HSRG) configured to receive and cool the gaseous exhaust stream before introduction to the at least one blower.

3. The system of claim 2, wherein the second cooling unit comprises a direct contact cooler (DCC) section.

4. The system of claim 2, wherein the second cooling unit comprises a HRSG.

5. The system of claim 2, wherein the HRSG further comprises cooling water coils and wherein the exhaust gas recirculation system further comprises a separator configured to receive the gaseous exhaust stream from the cooling water coils of the HRSG and remove water droplets from the gaseous exhaust stream before introduction to the blower.

6. The system of claim 5 wherein the separator comprises a vane pack.

7. The system of claim 3, wherein the HRSG further comprises cooling water coils and wherein the exhaust gas recirculation system further comprises a separator configured to receive the gaseous exhaust stream from the cooling water coils of the HRSG and remove water droplets from the gaseous exhaust stream before introduction to the blower.

8. The system of claim 7 wherein the separator comprises a vane pack.

9. The system of claim 2, wherein
   the second cooling unit comprises a second HRSG and each of the first and second cooling units further comprise cooling water coils; and the exhaust gas recirculation system further comprises a first separator configured to receive the gaseous exhaust stream from the cooling water coils of the first cooling unit and remove water droplets from the gaseous exhaust stream before introduction to the blower and a second separator configured to receive the cooled recycle gas from the cooling water coils of the second cooling unit and remove water droplets from the cooled recycle gas before introduction to the main compressor.

10. The system of claim 9 wherein the first separator, the second separator, or both of the first and second separators comprise a vane pack.

11. The system of claim 3, wherein the exhaust gas recirculation system employs psychrometric cooling of the gaseous exhaust stream.

12. The system of claim 11, wherein
water is added to the gaseous exhaust stream to saturate or nearly saturate the gaseous exhaust stream before introduction to the blower;
the exhaust gas recirculation system further comprises a separator configured to receive the saturated or nearly saturated gaseous exhaust stream and remove water droplets from the saturated or nearly saturated gaseous exhaust stream before introduction to the blower; and
the second cooling unit is further configured to remove water from the gaseous exhaust stream and recycle at least part of the water removed.

13. The system of claim 12, wherein a first portion of the water removed in the second cooling unit is recycled and added to the gaseous exhaust stream upstream of the separator and a second portion of the water removed in the second cooling unit is recycled to the second cooling unit.

14. The system of claim 1, wherein the second cooling unit is configured to cause the cooled recycle gas to have a dew point margin of at least about 30° F.

15. The system of claim 3, wherein
the second cooling unit further comprises a glycol absorption section configured to receive the cooled recycle gas from the DCC section and at least partially dehydrate the cooled recycle gas before introduction to the main compressor; and
the exhaust gas recirculation system further comprises a glycol regeneration system configured to receive rich glycol from the glycol absorption section of the second cooling unit, thermally regenerate the rich glycol in a glycol regeneration column to form regenerated lean glycol, and return the regenerated lean glycol to the glycol absorption section.

16. The system of claim 15, wherein the glycol regeneration system is operated under vacuum conditions.

17. The system of claim 15, wherein the second cooling unit comprises the glycol regeneration column and the glycol regeneration column is configured to receive the gaseous exhaust stream from the blower before introduction to the DCC section.

18. The system of claim 17, wherein the second cooling unit further comprises a desuperheating section positioned between the glycol regeneration column and the DCC section.

19. The system of claim 1, wherein the combustion chamber is configured to combust one or more oxidants and one or more fuels in the presence of the compressed recycle stream and a high pressure steam coolant stream.

20. The system of claim 1, wherein the compressed recycle stream includes a steam coolant, which supplements the gaseous exhaust stream.

21. A method of generating power, comprising:
separately providing at least one oxidant and at least one fuel to a combustion chamber so that the at least one oxidant and the at least one fuel have a stoichiometric ratio of between 0.9:1 and 1.1:1 in the combustion chamber;
combusting the at least one oxidant and the at least one fuel in the presence of a compressed recycle exhaust gas, thereby generating a discharge stream;
expanding the discharge stream in an expander to at least partially drive a main compressor and generate a gaseous exhaust stream; and
directing the gaseous exhaust stream to an exhaust gas recirculation system, wherein the main compressor compresses the gaseous exhaust stream and thereby generates the compressed recycle stream;
wherein the exhaust gas recirculation system comprises (i) at least one cooling unit configured to receive and cool the gaseous exhaust stream, (ii) at least one blower configured to receive and increase the pressure of the gaseous exhaust stream before directing a cooled recycle gas to the main compressor, (iii) a second cooling unit configured to receive the gaseous exhaust stream from the at least one blower and to adjust a temperature and lower a dew point of the gaseous exhaust stream to the main compressor, wherein the second cooling unit is configured to cause the cooled recycle gas to have a dew point margin of at least about 20° F., and (iv) a feed/effluent cross exchanger in series with the second cooling unit configured to adjust the temperature of the cooled recycle gas to achieve the dew point margin
such that the gaseous exhaust stream is cooled in the at least one cooling unit and the pressure of the gaseous exhaust stream is increased in the at least one blower, thereby generating the cooled recycle gas directed to the main compressor.

22. The method of claim 21, wherein the at least one cooling unit is a heat recovery steam generator (HRSG) that cools the gaseous exhaust stream before the gaseous exhaust stream is introduced to the at least one blower.

23. The method of claim 22, wherein the second cooling unit comprises a direct contact cooler (DCC) section.

24. The method of claim 22, wherein the second cooling unit comprises a second HRSG.

25. The method of claim 22, wherein the HRSG further comprises cooling water coils and wherein the exhaust gas recirculation system further comprises a separator that receives the gaseous exhaust stream from the cooling water coils of the HRSG and removes water droplets from the gaseous exhaust stream before the gaseous exhaust stream is introduced to the blower.

26. The method of claim 25 wherein the separator comprises a vane pack.

27. The method of claim 26, wherein the HRSG further comprises cooling water coils and wherein the exhaust gas recirculation system further comprises a separator that receives the gaseous exhaust stream from the cooling water coils of the HRSG and removes water droplets from the gaseous exhaust stream before the gaseous exhaust stream is introduced to the blower.

28. The method of claim 27 wherein the separator comprises a vane pack.

29. The method of claim 22, wherein
the second cooling unit comprises a second HRSG and each of the first and second cooling units further comprise cooling water coils; and the exhaust gas recirculation system further comprises:
  a first separator that receives the gaseous exhaust stream from the cooling water coils of the first cooling unit and removes water droplets from the gaseous exhaust stream before the gaseous exhaust stream is introduced to the blower; and
  a second separator that receives the cooled recycle gas from the cooling water coils of the second cooling unit and removes water droplets from the cooled recycle gas before the cooled recycle gas is introduced to the main compressor.

30. The method of claim 29 wherein the first separator, the second separator, or both of the first and second separators comprise a vane pack.

31. The method of claim 22, wherein the exhaust gas recirculation system employs psychrometric cooling to further cool the gaseous exhaust stream.

32. The method of claim 31, wherein
the gaseous exhaust stream is saturated or nearly saturated with water before the gaseous exhaust stream is introduced to the blower;
the exhaust gas recirculation system further comprises a separator that receives the saturated or nearly saturated gaseous exhaust stream and removes water droplets from the saturated or nearly saturated gaseous exhaust stream before the gaseous exhaust stream is introduced to the blower; and
the second cooling unit removes water from the gaseous exhaust stream and at least part of the water removed by the second cooling unit is recycled.

33. The method of claim 32, wherein a first portion of the water removed by the second cooling unit is recycled and added to the gaseous exhaust stream upstream of the separator and a second portion of the water removed in the second cooling unit is recycled to the second cooling unit.

34. The method of claim 22, wherein the second cooling unit is configured to cause dew point margin of the cooled recycle gas to have a dew point margin of at least about 30° F.

35. The method of claim 23, wherein
the second cooling unit further comprises a glycol absorption section that receives the cooled recycle gas from the DCC section and at least partially dehydrates the cooled recycle gas before the cooled recycle gas is introduced to the main compressor; and
the exhaust gas recirculation system further comprises a glycol regeneration system that receives rich glycol from the glycol absorption section of the second cooling unit, thermally regenerates the rich glycol in a glycol regeneration column to form regenerated lean glycol, and returns the regenerated lean glycol to the glycol absorption section.

36. The method of claim 35, wherein the glycol regeneration system is operated under vacuum conditions.

37. The method of claim 36, wherein the second cooling unit comprises the glycol regeneration column and the glycol regeneration column receives the gaseous exhaust stream from the blower before the gaseous exhaust stream is introduced to the DCC section.

38. The method of claim 37, wherein the second cooling unit further comprises a desuperheating section receives the gaseous exhaust stream from the glycol regeneration column and cools the gaseous exhaust stream to a temperature sufficient to at least partially condense glycol from the gaseous exhaust stream before the gaseous exhaust stream is introduced to the DCC section.

39. The method of claim 21, wherein the at least one oxidant and the at least one fuel are combusted in the combustion chamber in the presence of the compressed recycle exhaust gas and high pressure steam.

40. The system of claim 20, further comprising a water recycle loop to provide the steam coolant.

41. The method of claim 21, further comprising adding a steam coolant to the compressed recycle stream to supplement the gaseous exhaust stream.

42. The method of claim 41, further comprising a water recycle loop to provide the steam coolant.

* * * * *